(12) United States Patent
Ramirez et al.

(10) Patent No.: US 12,481,926 B2
(45) Date of Patent: Nov. 25, 2025

(54) SYSTEMS AND METHODS FOR HYBRID INTEGRATION AND DEVELOPMENT PIPELINES

(71) Applicant: Covid Cough, Inc., Greenwood Village, CO (US)

(72) Inventors: Maurice A. Ramirez, Lake Wales, FL (US); Morgan Cox, Lakewood, CO (US); Mark Fogarty, Clemson, SC (US); Robert F. Scordia, Brooklyn, NY (US); Nolan Donaldson, Denver, CO (US); Adam Stogsdill, Cypress, TX (US); Simon Kotchou, Phoenix, AZ (US); Michael V. Bivins, Orlando, FL (US); Allison A. Sakara, Lake Wales, FL (US); Karl Kelley, Springfield, TN (US); Mona Kelley, Springfield, TN (US); James Simonson, Erie, CO (US)

(73) Assignee: Covid Cough, Inc., Greenwood Village, CO (US)

( * ) Notice: Subject to any disclaimer, the term of this patent is extended or adjusted under 35 U.S.C. 154(b) by 916 days.

(21) Appl. No.: 17/705,151

(22) Filed: Mar. 25, 2022

(65) Prior Publication Data
US 2022/0309407 A1    Sep. 29, 2022

Related U.S. Application Data

(60) Provisional application No. 63/166,194, filed on Mar. 25, 2021.

(51) Int. Cl.
*G06N 20/20* (2019.01)
*G06F 8/60* (2018.01)
(Continued)

(52) U.S. Cl.
CPC .............. *G06N 20/20* (2019.01); *G06F 8/60* (2013.01); *G06N 3/084* (2013.01); *G06N 20/00* (2019.01)

(58) Field of Classification Search
CPC ........ G06N 20/00; G06N 20/10; G06N 20/20; G06N 3/02; G06N 3/08; G06N 3/082;
(Continued)

(56) References Cited

U.S. PATENT DOCUMENTS

| | | | |
|---|---|---|---|
| 5,199,077 A | 3/1993 | Wilcox et al. | |
| 5,660,176 A | 8/1997 | Iliff | |

(Continued)

FOREIGN PATENT DOCUMENTS

| | | |
|---|---|---|
| CN | 108766419 B | 10/2020 |
| WO | 2020051256 A1 | 3/2020 |

(Continued)

OTHER PUBLICATIONS

Al Texsoft. "MLOps: Methods and Tools of DevOps for Machine Learning." Jul. 23, 2020 Retrieved on Jun. 26, 2022 from <https://www.altexsoft.com/blog/mlops-methods-tools/> entire document.

(Continued)

*Primary Examiner* — Shane D Woolwine
(74) *Attorney, Agent, or Firm* — Greenberg Traurig, LLP; David J. Dykeman; Kristopher Reichlen

(57) ABSTRACT

Systems and methods provide a HybridOps model for the identification, capture, isolation, feature engineering and adjudication of source signal data signatures for inclusion in calibration quality standard reference signal data signature libraries that improve machine learning and validation, reduces model bias and reduces model drift. The HybridOps model may include an "unlocked" AI/ML (machine learning enabled) public facing deployment pipeline in parallel with a clone AI/ML deployed in an internal development envi- (Continued)

ronment using a ML-Ops pipeline and in parallel with a clone "locked" AI/ML (machine learning disabled) as a standard reference. The three deployed models enables monitoring and measuring model drift, context drift and product progression for improved verification and validation of model reliability. The parallel environment AI/ML testing using randomized learning, validation, testing sets drawn from calibration quality adjudicated standard reference signal data signature libraries provides for validation, verification and test to failure procedures.

20 Claims, 11 Drawing Sheets

(51) Int. Cl.
    *G06N 3/084* (2023.01)
    *G06N 20/00* (2019.01)
(58) Field of Classification Search
    CPC ........ G06N 3/084; G06N 3/091; G06N 3/092; G06N 3/094; G06N 3/096; G06N 3/098; G06N 3/10; G06F 8/60
    See application file for complete search history.

(56) References Cited

U.S. PATENT DOCUMENTS

| | | | |
|---|---|---|---|
| 7,386,453 | B2 | 6/2008 | Polanyi et al. |
| 9,015,093 | B1 | 4/2015 | Commons |
| 9,418,059 | B1 | 8/2016 | Singliar et al. |
| 10,098,569 | B2 | 10/2018 | Abeyratne et al. |
| 10,796,714 | B2 | 10/2020 | Levanon et al. |
| 11,240,181 | B1 | 2/2022 | Nagaraja et al. |
| 2004/0193419 | A1 | 9/2004 | Kimball et al. |
| 2007/0026406 | A1 | 2/2007 | ElGhaoui et al. |
| 2007/0276278 | A1 | 11/2007 | Coyle et al. |
| 2008/0059152 | A1 | 3/2008 | Fridman et al. |
| 2009/0125623 | A1 | 5/2009 | Garg et al. |
| 2009/0311657 | A1 | 12/2009 | Dodelson et al. |
| 2016/0078167 | A1 | 3/2016 | Rosner et al. |
| 2016/0246772 | A1 | 8/2016 | Hoover et al. |
| 2017/0003948 | A1 | 1/2017 | Iyer et al. |
| 2017/0180266 | A1 | 6/2017 | Frank et al. |
| 2017/0278018 | A1 | 9/2017 | Winih et al. |
| 2018/0060512 | A1 | 3/2018 | Sorenson et al. |
| 2018/0182362 | A1 | 6/2018 | Li |
| 2019/0347557 | A1 | 11/2019 | Khan |
| 2019/0348064 | A1 | 11/2019 | Lesso |
| 2020/0008725 | A1 | 1/2020 | Bach et al. |
| 2020/0015709 | A1 | 1/2020 | Peltonen et al. |
| 2020/0027558 | A1 | 1/2020 | Abeyratne et al. |
| 2020/0034553 | A1 | 1/2020 | Kenyon et al. |
| 2020/0143267 | A1 | 5/2020 | Gidney |
| 2020/0152330 | A1 | 5/2020 | Anushiravani et al. |
| 2020/0193735 | A1 | 6/2020 | Jung et al. |
| 2020/0210538 | A1 | 7/2020 | Wang et al. |
| 2020/0234188 | A1* | 7/2020 | Maffei Vallim ........ H04L 67/10 |
| 2020/0323484 | A1 | 10/2020 | Aronovich et al. |
| 2020/0327379 | A1* | 10/2020 | Dong ..................... G06N 3/084 |
| 2020/0337625 | A1 | 10/2020 | Aimone et al. |
| 2020/0381130 | A1 | 12/2020 | Edwards et al. |
| 2020/0388287 | A1 | 12/2020 | Anushiravani et al. |
| 2020/0411036 | A1 | 12/2020 | Daimo |
| 2021/0049421 | A1 | 2/2021 | Tandecki et al. |
| 2021/0076977 | A1 | 3/2021 | Abeyratne et al. |
| 2021/0128074 | A1 | 5/2021 | Leydon |
| 2021/0219893 | A1 | 7/2021 | Luz et al. |
| 2021/0234668 | A1 | 7/2021 | Manamohan et al. |
| 2021/0248517 | A1 | 8/2021 | Soppin et al. |
| 2021/0338154 | A1 | 11/2021 | Abeyratne |
| 2021/0357586 | A1 | 11/2021 | Archuleta |
| 2022/0027725 | A1 | 1/2022 | Nongpiur et al. |
| 2022/0058339 | A1 | 2/2022 | Archuleta |
| 2022/0067445 | A1 | 3/2022 | Archuleta et al. |
| 2022/0122740 | A1 | 4/2022 | Nematiosseinabadi et al. |
| 2022/0130415 | A1 | 4/2022 | Garrison et al. |
| 2022/0215248 | A1 | 7/2022 | Ramirez et al. |
| 2022/0293123 | A1 | 9/2022 | Ramirez et al. |
| 2022/0300856 | A1 | 9/2022 | Archuleta et al. |
| 2023/0368000 | A1 | 11/2023 | Cox et al. |
| 2023/0368026 | A1 | 11/2023 | Cox et al. |
| 2024/0127078 | A1 | 4/2024 | Elyaderani et al. |

FOREIGN PATENT DOCUMENTS

| | | | |
|---|---|---|---|
| WO | 2020069048 | A1 | 4/2020 |
| WO | 2020104465 | A2 | 5/2020 |
| WO | 2021119742 | A1 | 6/2021 |
| WO | 2021119743 | A1 | 6/2021 |
| WO | 2021253093 | A1 | 12/2021 |
| WO | 2022051523 | A1 | 3/2022 |
| WO | 2022091062 | A1 | 5/2022 |
| WO | 2022147566 | A1 | 7/2022 |
| WO | 2022192606 | A1 | 9/2022 |
| WO | 2022198105 | A1 | 9/2022 |
| WO | 2023220665 | A1 | 11/2023 |
| WO | 2023220683 | A1 | 11/2023 |

OTHER PUBLICATIONS

Rodriguez et al. "Hybrid analysis pipelines in the REANA reproducible analysis platform." EPJ Web of Conferences. vol. 245. EDP Sciences, 2020. Nov. 16, 2020. Retrieved on Jun. 26, 2022 from <https://www .epj-conferences.org/articles/epjconf /abs/2020/21 / epjconf _ chep2020 _ 06041 /epjco nf_chep2020_06041.html> entire document.

Shen, "Movements Classification of Multi-Channel sEMG Based on CNN and Stacking Ensemble Learning" Special Section on Smart Health Sensing and Computational Intelligence: from Big Data to Big Impacts. IEEE Access, vol. 7, pp. 137489-137500, Oct. 3, 2019.

Stewart "Software as a Medical Device (SAMO): Clinical Evaluation—Guidance for Industry 1-20 and Food and Drug Administration Staff" U.S. Department of Health and Human Services, Food and Drug Administration, Dec. 8, 2017, Retrieved on Jun. 26, 2022 from <https://www.fda.gov/files/medical% 20devices/publish_ed/Software-as-a-Medical-Device-%28SAMD% 29-Clinical-Evaluation-Guidance-for-Industry-and-Food-and-Drug-Administration-Staff.pdf> entire document.

Teyhouee, "Cough Detection Using Hidden Markov Models" arxiv. Arxiv.org. Apr. 28, 2019 DOI: ARxIV:1904.12354v1.

International Search Report in International Application No. PCT/US2022/022048 mailed Jul. 21, 2022.

Ratri et al., "A Comparative Study on Signature Recognition", IEEE, pp. 167-171, Nov. 8, 2014. Retrieved from the Internet: Ratri et al., "A Comparative Study on Signature Recognition", IEEE, https://ieeexplore.ieee.org/stamp/stamp.jsp?tp=&arbynber= 7065735.

Brownlee: A Gentle Introduction to Imbalanced Classification (Year: 2020).

Chen: When Machine Learning Meets Blockchain 2018 (Year: 2018).

Guha: One Shot Federated Learning 2019 (Year: 2019).

Herresthal: Swarm Learning for Decentralized Confidential Clinical ML May 2021 (Year: 2021).

Herresthal: Swarm Learning privacy ML Disease Classification_ 2020 (Year: 2020).

Jackson: City of Jackson COVID19 Symptom Collector Chrysalis Partners Apr. 2020 (Year: 2020).

Jadon: What Happens When You Run a Computer Program 2020 Loading Programs into RAM (Year: 2020).

Kolding: Chrysalis Partners Launches Covid19 Symptom Collector_ Apr. 2020 (Year: 2020).

Li: Explicit Inductive Bias for Transfer Learning CNNs 2018 (Year: 2018).

Liu: Bagging based ensemble transfer learning 2016 (Year: 2016).

(56) References Cited

OTHER PUBLICATIONS

Liu: Cough Detection Using Deep Neural Networks 2014 (Year: 2014).
Merriam Webster: Compendium Definition & Meaning 2024 (Year: 2024).
Tan: A Survey on Deep Transfer Learning 2018 (Year: 2018).
Weiss: A survey of transfer learning 2016 (Year: 2016).
Zhuang: Comprehensive Survey on Transfer Learning 2020 (Year: 2020).
International Search Report in International Application No. PCT/US2023/066864 mailed Sep. 13, 2023.
International Search Report in International Application No. PCT/US2023/066888 mailed Sep. 18, 2023.
International Search Report in International Application No. PCT/US2023/072499 mailed Dec. 12, 2023.
Ashby, "A Novel Cough Audio Pre-Processing and Segmentation Algorithm for COVID-19 Detection," University of Brighton, School of Architecture, Technology and Engineering, Bachelor of Science Thesis, Jun. 2, 2022, www.researchgate.net/profile/Alice-Ashby/publication/363057325.
Ashby et al., "Cough-Based COVID-19 Detection with Audio Quality Clustering and Confidence Measure Based Learning," Conformal and Probabilistic Prediction with Applications, Proceedings of Machine Learning Research, pp. 129-148, Aug. 30, 2022.
Zhang et al., "Novel COVID-19 Screening Using Cough Recordings of a Mobile Patient Monitoring System," 2021 43rd Annual International Conference of the IEEE Engineering in Medicine & Biology Society (EMBC). IEEE, pp. 2353-2357, Nov. 7, 2021.
International Search Report in International Application No. PCT/US2023/066888 mailed Jan. 24, 2024.

\* cited by examiner

SYSTEMS AND METHODS FOR HYBRID INTEGRATION AND DEVELOPMENT PIPELINES

CROSS-REFERENCE TO RELATED APPLICATIONS

This application claims priority to U.S. Provisional Application No. 63/166,194 filed on 25 Mar. 2021 and entitled "SYSTEMS AND METHODS FOR HYBRID INTEGRATION AND DEVELOPMENT PIPELINES," and is herein incorporated by reference in its entirety.

TECHNICAL FIELD

The present disclosure relates to a hybrid techniques for the development, calibration, adjudication, training, validation, verification, testing, version control, deployment, post-market testing, prospective maintenance and product development of artificial intelligence (AI)/machine learning (ML) based software, such as AI/ML based software for medical device (SaMD) systems and other signal data signature based AI/ML systems.

BACKGROUND

Advancements in software, artificial intelligence and machine learning technologies have outstripped regulation by applicable law, regulation and regulatory guidance by governments, regulatory agencies and notified bodies. The result has been slow software as a medical device (SaMD) development and a gap between AI/ML industry standards and the practices procedures permitted by regulators. Even with this regulatory change, other industry standard ML-Ops procedures, including continuous integration/continuous deployment (CI/CD) pipelines may not be permitted for deployed approved medical devices.

SUMMARY

The present disclosure relates to a hybrid version of development (Dev) and IT operations (Ops) (hereinafter "DevOps") combined with ML-Ops adapted for the development, calibration, adjudication, training, validation, verification, testing, version control, deployment, post-market testing, prospective maintenance and product development of AI/ML based SaMD systems and other signal data signature based AI/ML systems. In particular this HybridOps system provides systems for identification, capture, engineering and adjudication of source signal data signatures to create calibration quality signal data signature libraries for the training and validation of AI/ML systems. The HybridOps system incorporates an industry standard software product build and testing pipeline integrated with a SaMD tolerance and performance testing model. This build and testing pipeline may be trifurcated for software deployment.

In some embodiments, a public facing, regulatory body approved version, "approved version," may be deployed in a DevOps model with no automatic or continuous development pipeline. The limitation of software changes to approved prospective maintenance and autonomous ML learning combined with model drift monitoring ensue that the public facing model approved as a SaMD remains within the approved indication for use and scope of operation. Two non-public facing clones of the approved version may be simultaneously deployed to identical environments.

A first clone, "development clone," may be deployed in a fully ML-Ops enabled developmental pipeline that may be NOT public facing. In some embodiments, ML-Ops refers to a development and integration pipeline for model training, testing and refinement. Thus, the development clone of the model may be a version of the model for ongoing development clone that receives all feedback from both its own feedback loop and from the feedback loop from the public facing clone of the model thus enabling model improvements based on ML-Ops feedback as well as public/user feedback. The two feedback loops may feed to a continuous improvement/continuous deployment (CI/CD) ML-Ops pipeline.

In some embodiments, a second clone, "standard reference clone," may function as a reference for AI/ML evolution as well as the developmental version leading to the next product for regulatory approval. The standard reference clone of the model may be deployed as a DevOps model, but with the ML learning "locked" (no machine learning). As with the DevOps and ML-Ops deployments, the post market testing feedback loop from the standard reference clone deployment feeds to the CI/CD pipeline for the ML-Ops version. Thus, the standard reference clone may function as a standard reference (glass box) version of the model and as a reference for monitoring model drift and concept drift.

In some aspects, the techniques described herein relate to a method including: receiving, by at least one processor, a set of source signal data; extracting, by the at least one processor, a set of signal features from the set of source signal data to produce a set of signal data signatures for each source signal data record in the set of source signal data; generating, by the at least one processor, signal data signature features for each signal data signature of the set of signal data signatures based at least in part on the set of signal features; training, by the at least one processor, a machine learning model based on the signal data signature features for each signal data signature of the set of signal data signatures; deploying, by the at least one processor, a public facing machine learning model approved as a SaMD of the machine learning model for public deployment; deploying, by the at least one processor, a development clone of the machine learning model for use in a ML-Ops pipeline of an internal development environment; deploying, by the at least one processor, a locked clone of the machine learning model for use as a standard reference; receiving, by the at least one processor, external feedback from the public facing model including at least one public facing model performance metric indicative of public facing model performance of the public facing model; receiving, by the at least one processor, internal feedback from the development clone including at least one internal model performance metric indicative of internal model development performance of the development clone; receiving, by the at least one processor, internal feedback from the locked clone including at least one internal locked model performance metric indicative of internal locked model performance of the locked clone; measuring, by the at least one processor, a model drift, a context drift and a model progression based at least in part on a difference between: at least one public facing model performance metric, and the at least one internal locked model performance metric; and optimizing, by the at least one processor, the development clone of the machine learning model based at least in part on the model drift, the context drift and the model progression.

In some aspects, the techniques described herein relate to a method, further including: receiving, by the at least one processor, user feedback from at least one user device having the public facing machine learning model; wherein the user feedback includes at least one user input indicating an accuracy of at least one prediction by the public facing machine learning model; receiving, by the at least one processor, a data log including at least one user signal data signature associated with the at least one prediction; generating, by the at least one processor, a training pair including the at least one user input and the at least one user signal data signature; and training, by the at least one processor, the development clone of the machine learning model based at least in part on the training pair.

In some aspects, the techniques described herein relate to a method, further including: receiving, by the at least one processor, developer feedback from at least one developer device having the locked clone of the machine learning model; wherein the developer feedback includes at least one developer input indicating an accuracy of at least one prediction by the locked clone of the machine learning model; receiving, by the at least one processor, a data log including at least one developer signal data signature associated with the at least one prediction; generating, by the at least one processor, a training pair including the at least one developer input and the at least one developer signal data signature; and training, by the at least one processor, the development clone of the machine learning model based at least in part on the training pair.

In some aspects, the techniques described herein relate to a method, further including: generating, by the at least one processor, a second version of the development clone in response to optimizing the development clone; wherein a first version of the development clone includes the development clone before optimizing the development; and storing, by the at least one processor, the first version of the development clone and the second version of the development clone in a version control database.

In some aspects, the techniques described herein relate to a method, further including redeploying, by the at least one processor, the development clone of the machine learning model using the second version.

In some aspects, the techniques described herein relate to a method, wherein the set of source signal data includes a set of audio recordings, and the set of signal features include a set of source signal spectrograms associated with the set of audio recordings.

In some aspects, the techniques described herein relate to a method, further including: filtering, by the at least one processor, each audio recording of the set of audio records with a first filter module to produce a first set of filtered audio recordings; wherein the first filter module includes a first combination of audio filters arranged in a first sequence; filtering, by the at least one processor, each filtered audio recording of the first set of filtered audio recordings with at least one second filter module to produce a second set of filtered audio recordings; wherein the at least one second filter module includes at least one second combination of audio filters arranged in at least one second sequence; and generating, by the at least one processor, the set of source signal spectrograms based at least in part on a mel-scale spectrogram of each filtered audio recording of the second set of filtered audio recordings.

In some aspects, the techniques described herein relate to a system including: at least one processor configured to execute software instructions that cause the at least one processor to perform steps to: receive a set of source signal data; extract a set of signal features from the set of source signal data to produce a set of signal data signatures for each source signal data record in the set of source signal data; generate signal data signature features for each signal data signature of the set of signal data signatures based at least in part on the set of signal features; train a machine learning model based on the signal data signature features for each signal data signature of the set of signal data signatures; deploy a public facing machine learning model approved as a SaMD of the machine learning model for public deployment; deploy a development clone of the machine learning model for use in a ML-Ops pipeline of an internal development environment; deploy a locked clone of the machine learning model for use as a standard reference; receive external feedback from the public facing model including at least one public facing model performance metric indicative of public facing model performance of the public facing model; receive internal feedback from the development clone including at least one internal model performance metric indicative of internal model development performance of the development clone; receive internal feedback from the locked clone including at least one internal locked model performance metric indicative of internal locked model performance of the locked clone; measure a model drift, a context drift and a model progression based at least in part on a difference between: at least one public facing model performance metric, and the at least one internal locked model performance metric; and optimize the development clone of the machine learning model based at least in part on the model drift, the context drift and the model progression.

In some aspects, the techniques described herein relate to a system, wherein the at least one processor is further configured to execute software instructions that cause the at least one processor to perform steps to: receive user feedback from at least one user device having the public facing machine learning model; wherein the user feedback includes at least one user input indicating an accuracy of at least one prediction by the public facing machine learning model; receive a data log including at least one user signal data signature associated with the at least one prediction; generate a training pair including the at least one user input and the at least one user signal data signature; and train the development clone of the machine learning model based at least in part on the training pair.

In some aspects, the techniques described herein relate to a system, wherein the at least one processor is further configured to execute software instructions that cause the at least one processor to perform steps to: receive developer feedback from at least one developer device having the locked clone of the machine learning model; wherein the developer feedback includes at least one developer input indicating an accuracy of at least one prediction by the locked clone of the machine learning model; receive a data log including at least one developer signal data signature associated with the at least one prediction; generate a training pair including the at least one developer input and the at least one developer signal data signature; and train the development clone of the machine learning model based at least in part on the training pair.

In some aspects, the techniques described herein relate to a system, wherein the at least one processor is further configured to execute software instructions that cause the at least one processor to perform steps to: generate a second version of the development clone in response to optimizing the development clone; wherein a first version of the development clone includes the development clone before optimizing the development; and store the first version of the development clone and the second version of the development clone in a version control database.

In some aspects, the techniques described herein relate to a system, wherein the at least one processor is further configured to execute software instructions that cause the at least one processor to perform steps to redeploy the development clone of the machine learning model using the second version.

In some aspects, the techniques described herein relate to a system, wherein the set of source signal data includes a set of audio recordings, and the set of signal features include a set of source signal spectrograms associated with the set of audio recordings.

In some aspects, the techniques described herein relate to a system, wherein the at least one processor is further configured to execute software instructions that cause the at least one processor to perform steps to: filter each audio recording of the set of audio records with a first filter module to produce a first set of filtered audio recordings; wherein the first filter module includes a first combination of audio filters arranged in a first sequence; filter each filtered audio recording of the first set of filtered audio recordings with at least one second filter module to produce a second set of filtered audio recordings; wherein the at least one second filter module includes at least one second combination of audio filters arranged in at least one second sequence; and generate the set of source signal spectrograms based at least in part on a mel-scale spectrogram of each filtered audio recording of the second set of filtered audio recordings.

In some aspects, the techniques described herein relate to a non-transitory computer readable medium having software instructions stored thereon, the software instructions configured to cause at least one processor to perform steps including: receiving a set of source signal data; extracting a set of signal features from the set of source signal data to produce a set of signal data signatures for each source signal data record in the set of source signal data; generating signal data signature features for each signal data signature of the set of signal data signatures based at least in part on the set of signal features; training a machine learning model based on the signal data signature features for each signal data signature of the set of signal data signatures; deploying a public facing machine learning model approved as a SaMD of the machine learning model for public deployment; deploying a development clone of the machine learning model for use in a ML-Ops pipeline of an internal development environment; deploying a locked clone of the machine learning model for use as a standard reference; receiving external feedback from the public facing model including at least one public facing model performance metric indicative of public facing model performance of the public facing model; receiving internal feedback from the development clone including at least one internal model performance metric indicative of internal model development performance of the development clone; receiving internal feedback from the locked clone including at least one internal locked model performance metric indicative of internal locked model performance of the locked clone; measuring a model drift, a context drift and a model progression based at least in part on a difference between: at least one public facing model performance metric, and the at least one internal locked model performance metric; and optimizing the development clone of the machine learning model based at least in part on the model drift, the context drift and the model progression.

In some aspects, the techniques described herein relate to a non-transitory computer readable medium, wherein the steps further include: receiving user feedback from at least one user device having the public facing machine learning model; wherein the user feedback includes at least one user input indicating an accuracy of at least one prediction by the public facing machine learning model; receiving a data log including at least one user signal data signature associated with the at least one prediction; generating a training pair including the at least one user input and the at least one user signal data signature; and training the development clone of the machine learning model based at least in part on the training pair.

In some aspects, the techniques described herein relate to a non-transitory computer readable medium, wherein the steps further include: receiving developer feedback from at least one developer device having the locked clone of the machine learning model; wherein the developer feedback includes at least one developer input indicating an accuracy of at least one prediction by the locked clone of the machine learning model; receiving a data log including at least one developer signal data signature associated with the at least one prediction; generating a training pair including the at least one developer input and the at least one developer signal data signature; and training the development clone of the machine learning model based at least in part on the training pair.

In some aspects, the techniques described herein relate to a non-transitory computer readable medium, wherein the steps further include: generating a second version of the development clone in response to optimizing the development clone; wherein a first version of the development clone includes the development clone before optimizing the development; and storing the first version of the development clone and the second version of the development clone in a version control database.

In some aspects, the techniques described herein relate to a non-transitory computer readable medium, wherein the steps further include redeploying the development clone of the machine learning model using the second version.

In some aspects, the techniques described herein relate to a non-transitory computer readable medium, wherein the set of source signal data includes a set of audio recordings, and the set of signal features include a set of source signal spectrograms associated with the set of audio recordings; and wherein the steps further include: filtering each audio recording of the set of audio records with a first filter module to produce a first set of filtered audio recordings; wherein the first filter module includes a first combination of audio filters arranged in a first sequence; filtering each filtered audio recording of the first set of filtered audio recordings with at least one second filter module to produce a second set of filtered audio recordings; wherein the at least one second filter module includes at least one second combination of audio filters arranged in at least one second sequence; and generating the set of source signal spectrograms based at least in part on a mel-scale spectrogram of each filtered audio recording of the second set of filtered audio recordings.

In some embodiments, the present disclosure provides an exemplary technically improved computer-based method that includes at least the following steps of receiving, by at least one processor, a set of source signal data; generating, by the at least one processor, a set of signal spectrograms from the set of source signal data to produce a set of signal data signatures for each source signal data record in the set of source signal data; generating, by the at least one processor, signal data signature features for each signal data signature of the set of signal data signatures based at least in part on the set of signal spectrograms; training, by the at least one processor, at least one machine learning model based on the signal data signature features for each signal data signature of the set of signal data signatures; deploying, by the at least one processor, a public facing model approved as a SaMD of the at least one machine learning model for use in a development information technology operations (DevOps) pipeline; deploying, by the at least one processor, a cloned version of the at least one machine learning model for use in a ML-Ops pipeline of an internal development environment; deploying, by the at least one processor, a locked cloned version of the at least one machine learning model for use as a standard reference; and measuring, by the at least one processor, a model drift, a context drift and a model progression based at least in part on a difference between the cloned version of the at least one machine learning model in the internal development environment and the locked cloned version of the at least one machine learning model.

In some embodiments, the present disclosure provides an exemplary technically improved computer-based system that includes at least the following components of at least one processor configured to execute software instructions. The software instructions, upon execution, cause the at least one processor to perform steps to: receive a set of source signal data; generate set of signal spectrograms from the set of source signal data to produce a set of signal data signatures for each source signal data record in the set of source signal data; generate data signature features for each signal data signature of the set of signal data signatures based at least in part on the set of signal spectrograms; train at least one machine learning model based on the signal data signature features for each signal data signature of the set of signal data signatures; deploy public facing model approved as a SaMD of the at least one machine learning model for use in a development information technology operations (DevOps) pipeline; deploy a cloned version of the at least one machine learning model for use in a ML-Ops pipeline of an internal development environment; deploy a locked cloned version of the at least one machine learning model for use as a standard reference; and measure a model drift, a context drift and a model progression based at least in part on a difference between the cloned version of the at least one machine learning model in the internal development environment and the locked cloned version of the at least one machine learning model.

DETAILED DESCRIPTION

Figure 1A:
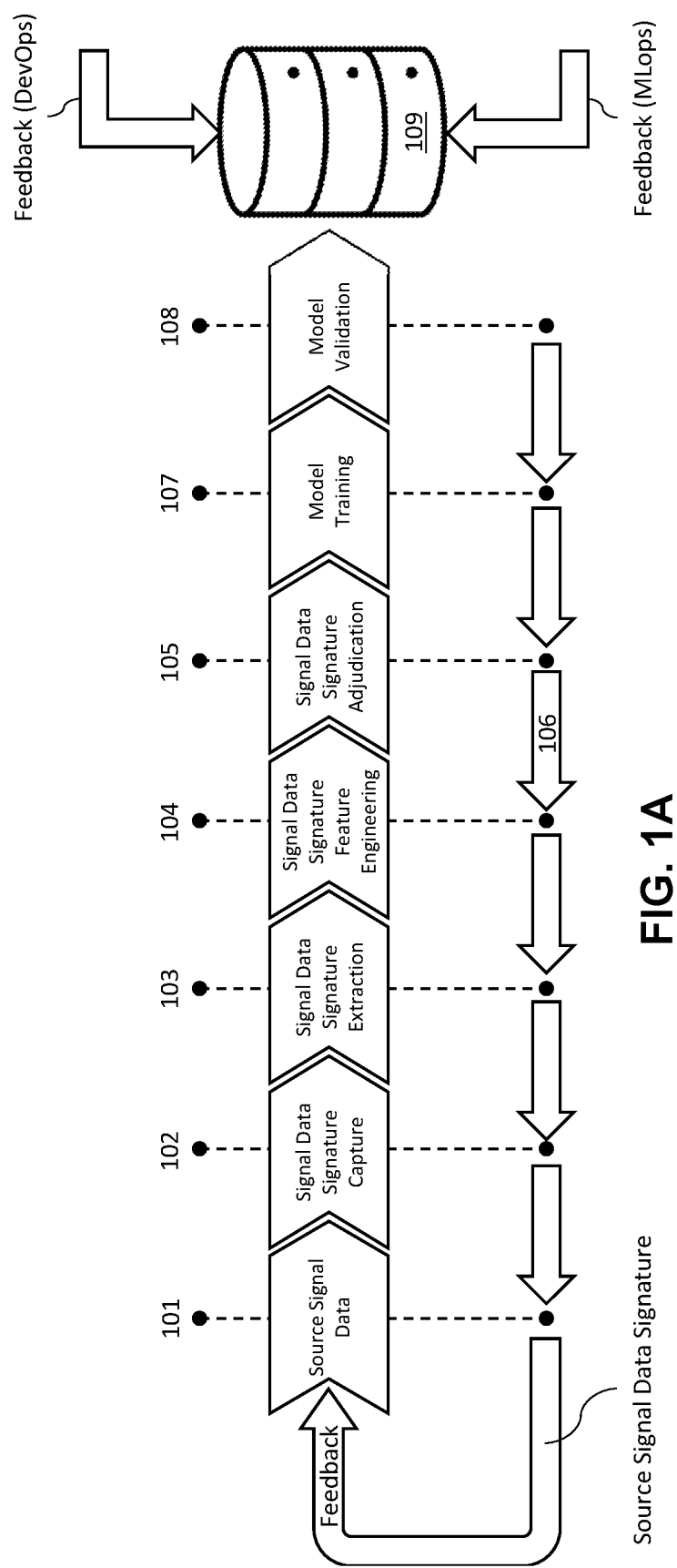
FIG. 1A depicts an illustrative HybridOps pipeline for development, deployment and updating of one or more machine learning models in accordance with aspects of embodiments of the present disclosure.

The present disclosure relates to a hybrid operating systems and methods for developing, calibrating, adjudicating, training, validating, verifying, testing, maintaining, controlling versions, deploying, post-market testing, prospectively maintaining and developing of artificial intelligence (AI)/machine learning (ML) based software, such as AI/ML based software for medical device (SaMD) systems and other signal data signature based AI/ML systems.

Various detailed embodiments of the present disclosure, taken in conjunction with the accompanying figures, are disclosed herein; however, it may be to be understood that the disclosed embodiments are merely illustrative. In addition, each of the examples given in connection with the various embodiments of the present disclosure may be intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set may be to be interpreted as meaning each of the items singularly as alternatives, as well as any combination of the listed items.

FIGS. 1 through 8 illustrate systems and methods of development, calibration, adjudication, training, validation, verification, testing, version control, deployment, post-market testing, prospective maintenance and product development of AI/ML based software. The following embodiments provide technical solutions and technical improvements that overcome technical problems, drawbacks and/or deficiencies in the technical fields involving inefficient machine learning model training for deployment scenarios having restrictions on integration and deployment pipelines, such as in medical devices. As explained in more detail, below, technical solutions and technical improvements herein include aspects of an improved software product build and testing pipeline integrated with a software as medical device tolerance and performance testing model that enables improved machine learning model training and development using a trifurcated for software deployment with at least one public facing and two or more private facing pipelines. Based on such technical features, further technical benefits become available to users and operators of these systems and methods. Moreover, various practical applications of the disclosed technology are also described, which provide further practical benefits to users and operators that are also new and useful improvements in the art.

Figure 1B:
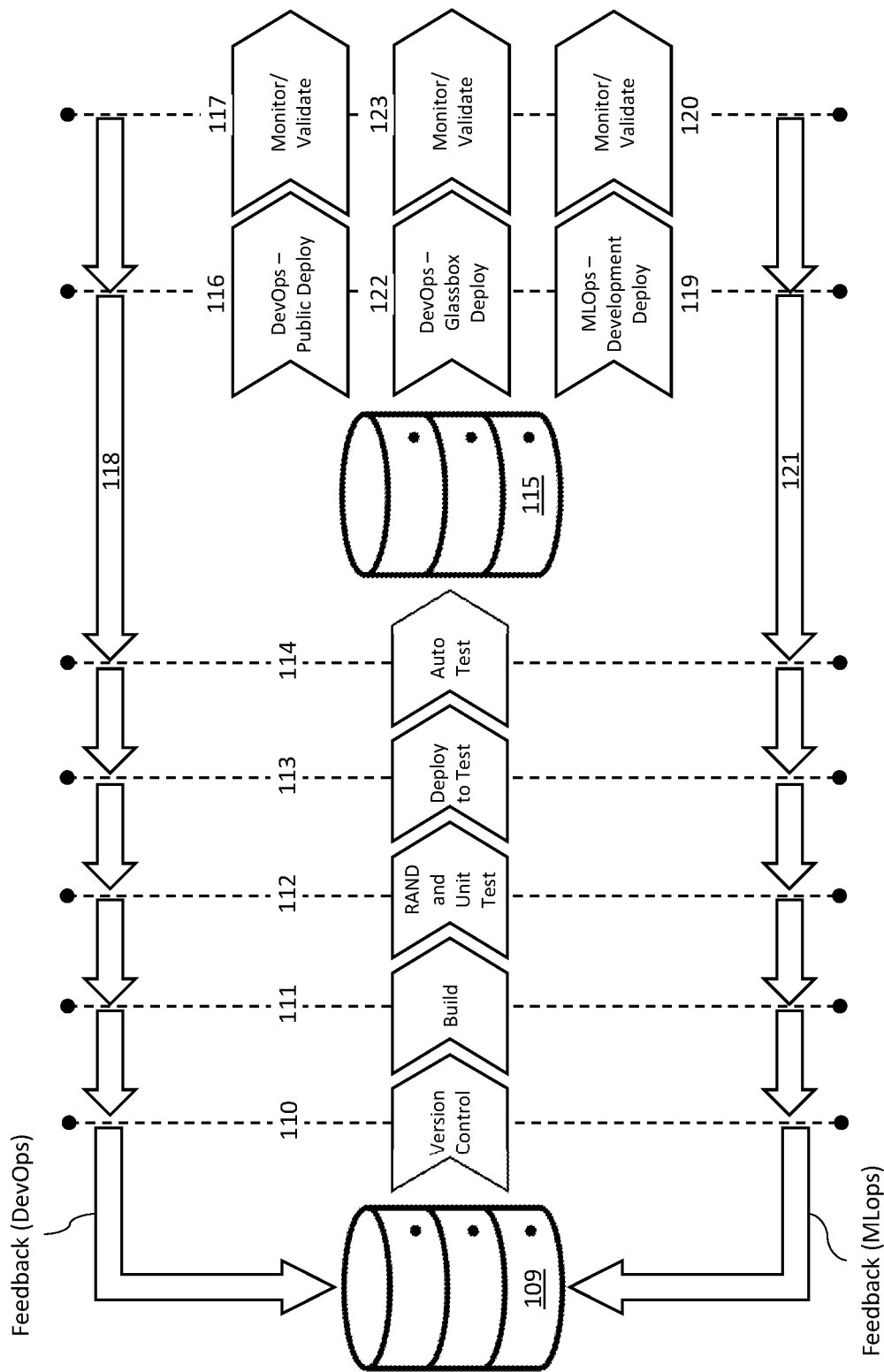
FIG. 1B depicts another illustrative HybridOps pipeline for development, deployment and updating of one or more machine learning models in accordance with aspects of embodiments of the present disclosure.

FIG. 1A and FIG. 1B are block diagrams of an exemplary computer-based system and platform for a HybridOps pipeline for development, deployment and updating of one or more machine learning models in accordance with aspects of embodiments of the present disclosure.

In some embodiments, the HybridOps pipeline may include multiple development, integration and deployment stages for development, calibration, adjudication, training, validation, verification, testing, version control, deployment, post-market testing, prospective maintenance and product development of artificial intelligence (AI)/machine learning (ML) based software, such as AI/ML based software for medical device systems and other signal data signature based AI/ML systems. The HybridOps pipeline may implement the stages in order to deploy multiple deployment versions at once where some versions are public facing (e.g., accessible to end-users to use in a production environment) and some versions are not public facing. For example, in some embodiments, the HybridOps pipeline may produce one public facing model approved as a SaMD for DevOps, one "glass box" DevOps version for transparent testing and development, and one development ML-Ops version.

In some embodiment, stage 101 of the HybridOps pipeline may include receiving source signal data. In SOME embodiment Source Signal Data may be sound, in another embodiment Source Signal Data may be visual imagery, in yet another embodiment Source Signal Data may be kinesthetic and/or physiometric measurements. Accordingly, the source signal data may include any suitable data type (e.g., data file, data object or other data record) for representing and communicating the sound, imagery, kinesthetic and/or physiometric measurements or any combination thereof.

In some embodiment, stage 102 of the HybridOps pipeline may include capturing of the source signal data. In some embodiments, sound may be captured by a microphone. In another embodiment visual information may be captured by a digital camera and/or infrared camera. In yet another embodiment movement and change in physical measurements may be captured by radar, ultrasound and/or radiographic techniques.

In some embodiment, stage 103 of the HybridOps pipeline may include extracting a signal data signature from the source signal data. In some embodiments, the signal data signature may be converted into Mel spectrograms. This may be done utilizing the librosa features library or other suitable spectrogram library. In some embodiments, when completing the conversion from way file or other audio file to a Mel spectrogram, the conversion may use values for Hop Length, e.g., of 22, or any other suitable value greater than 0 including, e.g., 1 millisecond (ms), 2 ms, 3 ms, 4 ms, 5 ms, 6 ms, 8 ms, 9 ms, 10 ms, 20 ms, 30 ms, 40 ms, 50 ms, 60 ms, 90 ms, 100 ms, 120 ms, or more. The conversion may use values for the length of the source signal data for fast Fourier transform (nFFT) including 2048 or any other suitable value greater than 0 that is larger than the size of the input data with the upper limit being 32,768 however it is preferable to select a value that is a power of 2 to optimize the performance and efficiency of the Fast Fourier Transform (FFT). For example, nFFT may include, e.g., 1, 2, 3, 4, 5, 6, 8, 9, 10, 20, 30, 40, 50, 60, 64, 90, 100, 120, 128, 256, 512, 1024, 2048, 5096 or more. The conversion may use values for the number of mel frequencies (n_mels) of 256, or any suitable value greater than 0 that is larger than the size of the input data with the upper limit being 32,768 for practical purposes, however it is preferable to select a value that is a power of 2 to optimize the performance and efficiency of the Fast Fourier Transform (FFT). For example, n_mels may be, e.g., 1, 2, 3, 4, 5, 6, 8, 9, 10, 20, 30, 40, 50, 60, 64, 90, 100, 120, 128, 256, 512, 1024, 2048, 5096 or more. At a high level, a Mel spectrogram may include a spectrogram that may be converted to the mel-scale. The mel-scale provides a linear scale for how humans perceive sound. The mel-scale may be useful for training models and may be similar to the way humans perceive sound.

In some embodiments, once the Mel spectrogram has been computed, the pipeline then computes the log, scales, and inverts the data. Scaling is used to standardize the pixel resolution and size of the spectrogram that is created. This ensures spectrogram images match the size which the machine learning models can support and accept. The Mel Spectrograms may be scaled to 170×220, or any combination of values which retains the original aspect ratio of 22:17. Another, alternate aspect ratio may be used but must be implemented on all Mel Spectrograms to maintain input data consistency. These steps help to make the images more interpretable for the model and easier to train on. This step may be important as it formats all the images so they are in a useable format for model training. This process helps get the data into a usable format for model training.

In some embodiment, stage 104 of the HybridOps pipeline may include feature engineering for producing features from the signal data signature. In one embodiment, Signal Data Signature Feature Engineering imposes standards upon the sample via one or more cleansing, filtering and/or normalizing processes. Additionally, any other suitable filters may be employed for signal quality optimization, such as one or more filters for, e.g., dynamic range modification (e.g., via dynamic range compression or expansion), optimization of signal to noise ratio, removal, suppression or otherwise mitigation of ancillary noise(s), implementation of bandlimiting to isolate frequency content within a range of interest (e.g., via resampling or the use of equalization filters), among other signal optimizations or any combination thereof. This filter may also act to address three qualitycentric concerns, specifically; stereo to mono compatibility, peak input loudness level, and attenuation of unrelated low frequencies or ancillary noises.

In some embodiments, a first function of the filter may address Stereo to Mono Compatibility, which combines the two channels of stereo information into one single mono representation. This ensures that only a single 'track' or 'channel' of the signal is being considered or analyzed at one time to avoid any potential issues that could arise from mono and stereo cross-compatibility The filter sums the signal to mono, then normalizes it, and raises peak level to its loudest possible factor while preserving all other spectral characteristics of the source; including frequency content, dynamic range, as well as the captured signal to noise ratio. In some embodiments, another step removes any ancillary, unwanted low frequency noises that could obscure the analysis of the target sound of the source file by implementing a High Pass Filter with a suitable Cutoff, e.g., between 1 hz and 250 hz at varying slopes. For example, in some embodiments, the Cutoff may include a frequency cutoff of 80 hz at a slope of −36 dB/8 va (Oct) or any other suitable frequency and slope removing low frequency noise.

In some embodiment, Signal Processing Feature Engineering includes revision processing modules for signal data processing chains, e.g., Revisions 1 through 5 (Rev1 through Rev5). FIG. 2 through FIG. 6 illustrate examples of processing models specific to each of Rev1 through Rev5. Primarily, these revisional processing modules may include chained filter sets that address numerous environmental and user-contingent inaccuracies, and simultaneously, the filter sets provide a series of incremental, multi-tiered perspectives of the source signal.

Figure 6:
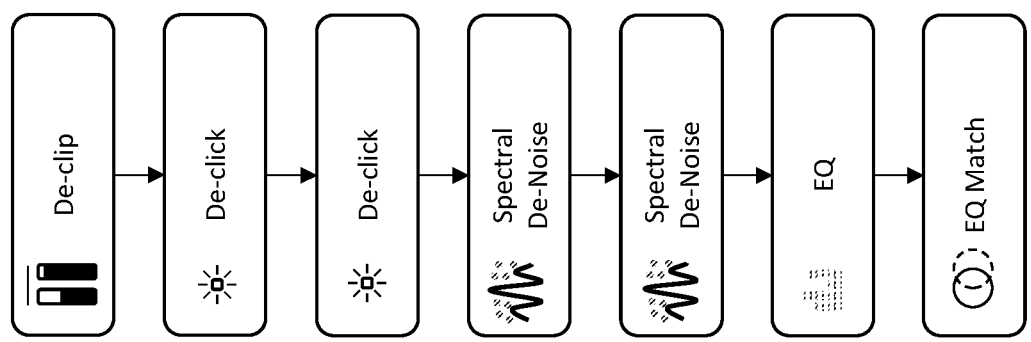
FIG. 6 illustrates an exemplary stand-alone filter module which includes a sequence of filters to process a signal data signal in accordance with one or more embodiments of the present disclosure.

In some embodiments, a revision processing engine that implements the revision processing modules for the signal processing feature engineering may include a suitable audio editing toolset and/or software program such as, e.g., iZotope RX 8 Audio Editor (v8.1.0.544) or other suitable audio editing software. In some embodiments, files may be loaded, individual or in a batch, into the program and run successively through several different filters, each one factoring into the next (e.g., Rev1 output feeds into Rev2, Rev2 into Rev3 etc.). In some embodiments, one or more of the revision processing modules may use the source signal as the input instead of the output of a prior module. For example, for Rev5 as illustrated in FIG. 6 may use the source signal may be the input. The revision processing may be designed to affect the source signal in a gradual manner, so that the source signal may be modified to the extent that may be required while preserving the initial information of the signal as much as possible. The revision processing modules use common audio signal processing techniques including; stereo to mono downmixing, high pass filtering, normalization, and gating, in addition to several iZotope RX 8 specific filters, namely "De-Clip", "De-Click", and "Spectral De-Noise".

Figure 2:
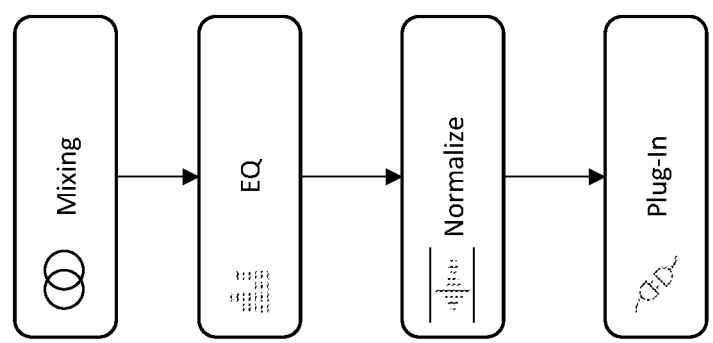
FIG. 2 illustrates a first filter module in a sequence of filter modules and includes a sequence of filters to process a signal data signal in accordance with one or more embodiments of the present disclosure.

Example of REV1 as Illustrated in FIG. 2

In some embodiments, as depicted in FIG. 2, the Input for Rev1 may include the source signal data, the signal data signature, or both. Rev1 may be similar to the stage 104 (above) with the first three filters being similar to the signal data signature feature engineering with the same purpose, with the addition of an additional layer, a gate (KiloHeartz Gate, 64 bit VST3 "Plug-In") added last.

In some embodiments, mixing from stereo to mono enables uniform stereo imaging. In some embodiments, an EQ removes unrelated low frequency noise with a filter at a cutoff frequency between 1 Hz and 250 Hz with a filter slope between −3 dB/8 va (oct) to −48 dB/8 va (oct). For example, in some embodiments, the Cutoff may instead include a frequency cutoff of 120 hz at a slope of −36 dB/8 va (Oct) or any other suitable frequency and slope for removing low frequency noise. Normalization ensures optimal peak signal level by increasing the level of the highest transient to reach a specified threshold which may be 0 dBFS or any other target signal level between −120 dBFS and 0 dBFS). In some embodiments, the gate removes any signal that drops below a given value (−20 dBFS), in order to better focus on the target signal.

Figure 3:
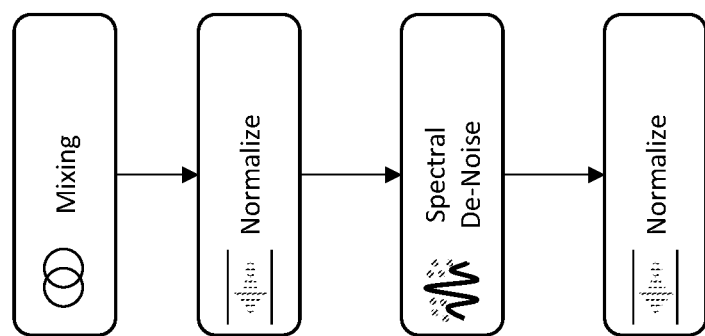
FIG. 3 illustrates a second filter module in a sequence of filter modules and includes a sequence of filters to process an output of a first filter module in accordance with one or more embodiments of the present disclosure.

Example of REV2 as Illustrated in FIG. 3

In some embodiments, as depicted in FIG. 3, the input of Rev2 may be the output from Rev1. Rev2 may be the first filter-set which utilizes one of the iZotope RX 8 processors, "Spectral De-Noise". Mixing from stereo to mono allows for uniform stereo imaging. Normalization ensures optimal peak signal level by increasing the level of the highest transient to reach a specified threshold which may be 0 dBFS or any other target signal level between −120 dBFS and 0 dBFS). Spectral De-Noise reduces the amount of noise in the signal. A second round of normalization ensures optimal peak signal level (Highest Transient raised to 0 dBFS) after any spectral attenuation.

Figure 4:
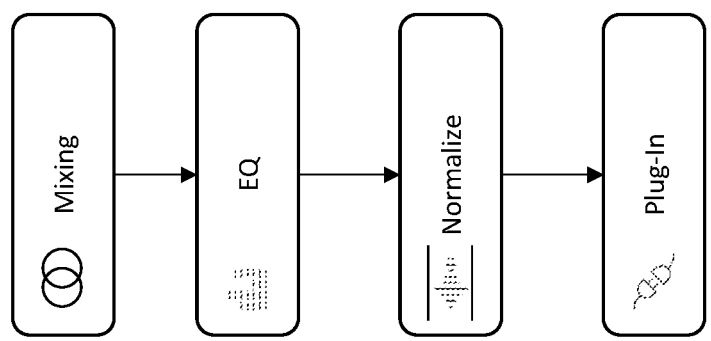
FIG. 4 illustrates a third filter module in a sequence of filter modules and includes a sequence of filters to process an output of a second filter module in accordance with one or more embodiments of the present disclosure.

Example of REV3 as Illustrated in FIG. 4

In some embodiments, as depicted in FIG. 4, the input of Rev3 may be the output from Rev2. The Rev3 filtering process may be identical to Rev1, and simply passes the modified Rev2 file through the Rev1 filter again, as Rev3. Mixing from stereo to mono allows for uniform stereo imaging. EQ removes unrelated low frequency noise with a filter at a cutoff frequency between 1 Hz and 250 Hz with a filter slope between −3 dB/8 va (oct) to −48 dB/8 va (oct). For example, in some embodiments, the Cutoff may instead include a frequency cutoff of 120 hz at a slope of −36 dB/8 va (Oct) or any other suitable frequency and slope for removing low frequency noise. Normalization ensures optimal peak signal level by increasing the level of the highest transient to reach a specified threshold which may be 0 dBFS or any other target signal level between −120 dBFS and 0 dBFS). A Gate removes any signal that drops below a given value, which may be −20 dBFS or any other target signal level between −120 dBFS and 0 dBFS, in order to better focus on the target signal.

Figure 5:
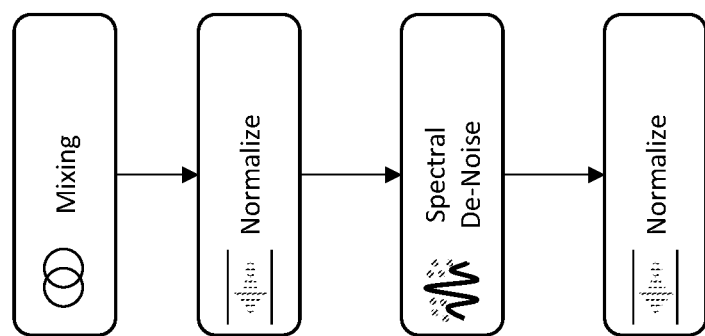
FIG. 5 illustrates a fourth filter module in a sequence of filter modules and includes a sequence of filters to process an output of a third filter module in accordance with one or more embodiments of the present disclosure.

Example of REV4 as Illustrated in FIG. 5

In some embodiments, as depicted in FIG. 5, the input of Rev4 may be the output from Rev3. The Rev4 filtering process may be identical to Rev2, and simply passes the modified Rev3 file through the Rev2 filter again, as Rev4. Mixing from stereo to mono allows for uniform stereo imaging. Normalization ensures optimal peak signal level by increasing the level of the highest transient to reach a specified threshold which may be 0 dBFS or any other target signal level between −120 dBFS and 0 dBFS). Spectral De-Noise reduces the amount of noise in the signal. A second round of normalization ensures optimal peak signal level after any spectral attenuation.

Example of REV5 as Illustrated in FIG. 6

In some embodiments, as depicted in FIG. 6, the input to Rev5 may include the source signal data, the signal data signature, or both. In some embodiments, Rev5 may be the only filter set other than Rev1 that takes the source signal as the input, rather than the output of the previous filter. By using the source signal data, the signal data signature, or both as the input to Rev5, Rev5 may address more unusual or high content issues such as especially resilient secondary ancillary noise such as human speech, natural and environmental ambience, analog or digital artifacts, distortion, clipping, pops or scratches from handling noise during capture, imperfections caused by variation in techniques used to perform and capture the target forced cough vocalization, or other issue(s) that files going through Rev1-4 either did not contain, or were not able to be rectified by the more gradual, subtle processing which Rev1-4 imparts. Primarily, Rev5 may utilize a preset chain to "Repair Damaged Dialogue". This preset may mitigate distortion from microphone input level overload ("clipping") using a suitable declipping tool such as, e.g., De-Clip of the iZotope RX 8 software. In some embodiments, the preset may also mitigate percussive noncough sibilance ("clicking") using a suitable tool one or more times, such as at least twice. The tool used to mitigate clicking may be any suitable tool such as, e.g., De-Click of the iZotope RX 8 software. In some embodiments, the preset may also mitigate noise using a suitable tool one or more times, such as at least twice. The tool used to mitigate noise may include a de-noising tool such as, e.g., Spectral De-Noise of the iZotope RX 8 software, twice to reduce the amount of noise in the signal. In some embodiments, the preset may also boost presence around the potential higher limit of Frequency response imposed by some cellular standards to using an equalizer matching tool enable comparing to any previous standard (e.g., a baseline signature or other standard). In some embodiments, the equalizer matching tool may include, e.g., EQ match with an EQ of, e.g., +3 dB @ 2 kHz or other EQ targeting to boost presence around the potential higher limit of Frequency response imposed by some cellular standards. Additionally, any other suitable filters may be employed for signal quality optimization, such as one or more filters for, e.g., dynamic range modification (e.g., via dynamic range compression or expansion), optimization of signal to noise ratio, removal, suppression or otherwise mitigation of ancillary noise(s), implementation of bandlimiting to isolate frequency content within a range of interest (e.g., via resampling or the use of equalization filters), among other signal optimizations or any combination thereof.

In some embodiment, stage 105 of the HybridOps pipeline may include signal data adjudication. In some embodiments, signal data adjudication may ensure that the signal data signature may be unchanged from the source signal data after the process of capturing, extracting and feature engineering.

In some embodiments, adjudication may include a standard process for regulatory standard references and for standardization of data across heterogeneous sources (sometimes referred to as Core Lab Review). In some embodiments, adjudication of the signal data and/or the extracted features may include a three step process: 1) At least two independent professionals, in this case a signal data engineer and a licensed medical professional with signal data experience independently review the feature engineered signal data signatures by comparing the feature engineered signal data signatures to the source signal data signature files. Each professional sets a threshold for "same" and the feature engineered files are sorted based on that threshold. If the two adjudicators do not agree on the threshold, a third adjudicator independently reviews the signal data signature files and assigns a threshold. The majority (2 of 3) threshold is then used to sort the signal data signature files.

In some embodiment, stage 106 of the HybridOps pipeline may include signal data signature loopback comparison and adjudication. In some embodiments, the wavelet hashing algorithm may be used as a means of extracting an accurate feature profile unique to every signal data signature file that enters and exits the pipeline. Wavelet hashing may be performed on the Mel spectrogram representation of the input signal data signature to extract its unique feature profile. The wavelet hashing algorithm uses Discrete Wavelet Transformations (DWT) as a form of frequency representation. It uses a Haar transformation to calculate the 8×8 hash that represents the feature profile of the input audio signal. After extracting the hash from the input audio signal, the differences between hashes of varying input signals can be calculated to easily determine the hash difference between the desired signals. The hash difference represents the dissimilarity between the feature profile of the input audio signals. A smaller hash difference is associated with a greater similarity between audio signals. The wavelet hashing results, are tested against a threshold. A threshold set at a level of 3 implies a 3% difference in the files that are being tested against each other from source signal data to Rev 1, 2, 3, 4 and/or Rev 5.

In some embodiment, a fuzzy hashing may be used to extract the feature profile. Wavelet hashing may be more accurate and/or efficient in some particular scenarios, such as extracting feature profiles for a signal data signature file as described above, while fuzzy hashing may be better as a more general purpose implementation that can directly compare source signal data signatures for similarity.

In some embodiments, thresholding may be determined by licensed medical providers acting as adjudicators to ensure signal data signature integrity. This threshold can vary between source signal data but may be crucial to the adjudication process. The reasoning behind the whole process may be to prevent files from being significantly altered from their original form. By applying this process, it may be possible to select files that still resemble the original file and thus keeping the original information that may be stored within the file as well. In this case information implies parts of the audio file that can be used for classification purposes. This adjudication process provides clean signal data signature files that would not be easily found in public datasets and prevents the input of "noisy" and "unclean" data into AI/ML models. If the adjudication may be skipped, we would expect to see poor AI/ML model performance as the data will not be as clean and/or altered too much from its original form, which alters the stored information and the final classification results.

In some embodiments, adjudicated calibration quality standardized reference source signal data signature files are collected and collated into training, validation and verification (testing) libraries for model training, model validation, SaMD validation testing, SaMD verification testing and SaMD Failure Testing.

In some embodiment, stage 107 of the HybridOps pipeline may include a model training stage. In one embodiment, adjudicated calibration quality standardized reference source signal data signature file may be used to train one or more machine learning models, such as, e.g., neural networks like 2D-CNN models and others. In some embodiments, the machine learning model(s) may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node may be activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

These models can vary in the use of hyperparameters and overall order of the model layers. The layers are selected from a selection of layers that are various mathematical functions. Each layer has trainable variables that, as the model may be trained will be assigned values to represent the training data. In some embodiments, to prevent errors in the training process, the data that may be input into a neural network model may be balanced between classes to prevent the neural network from creating heavier weights on a class that is input more frequently. Such unbalanced training may make the more frequent classes weighted heavier than other classes that are relatively underrepresented.

The data input to the model may be cleaned and preprocessed to prevent the neural network making predictions based on features such as background noise that do not distinguish the files but adds variance to the data set. In some embodiments, adjudication of the data input may facilitate accurate modeling by further preventing errors due to background noise. Accordingly, preprocessing the data may enable the neural network to perform better and discern between the true distinctions between classes, making it better at classifying new/unseen data.

In some embodiments, the neural network may be trained using random selection of files. The files are split into three different sets, training, validation, and testing. Training may be a majority of the data as the model uses this data set to learn/train the weights that help it classify observations. All of these training files are to be seen by the model during training. The validation and testing sets serve a similar purpose to the model. The major difference between the two may be that the validation set may be to be used during training of the model. This set may be not seen during the training but helps track the performance of the model as it learns on the training data set. The testing dataset may be only to be used as a final performance metric once the model has finished its current training run. The results calculated from this dataset provide an understanding of how the model performs on real-world data.

In another embodiment, an ensemble classifier may be utilized. This ensemble utilizes two or more models. At least one model may be trained on non-source signal data signature files and at least one trained on source signal signature files. The models provide a numerical result that identifies what class (non-source vs. source) to which the input file may be determined to belong. This ensemble can be used as a data filter classifier and/or as a data filter. The ensemble models are trained on clean data of the class it may be attempting to predict.

In some embodiments, training of the model may utilize feedback from the ML-Ops pipeline. In some embodiments, the model processes the features encoded in the feature vector by applying the parameters of the classifier machine learning model to produce a model output vector. In some embodiments, the model output vector may be decoded to generate one or more labels indicative of classification of a disease/condition/efficacy/biometric/etc. associated with a signal data signature file. In some embodiments, the model output vector may include or may be decoded to reveal a numerical output, e.g., one or more probability values between 0 and 1 where each probability value indicates a degree of probability that a particular label correctly classifies the source signal data signature files in the training library. In some embodiments, the model may test each probability value against a respective probability threshold. In some embodiments, each probability value has an independently learned and/or configured probability threshold. Alternatively or additionally, in some embodiments, one or more of the probability values of the model output vector may share a common probability threshold. In some embodiments, where a probability value is greater than the corresponding probability threshold, the source signal data signature files in the training library is labeled according to the corresponding label. For example, the probability threshold can be, e.g., greater than 0.5, greater than 0.6, greater than 0.7, greater than 0.8, greater than 0.9, or other suitable threshold value. Therefore, in some embodiments, the model may produce the classification of a disease/condition/efficacy/biometric/etc. associated with a signal data signature file for a particular source signal data signature files in the training library based on the probability value(s) of the model output vector and the probability threshold(s).

In some embodiments, the parameters of the model may be trained based on known outputs. For example, the source signal data signature files in the training library may be paired with a target classification or known classification to form a training pair, such as a training source signal data signature files in the training library and an observed result and/or human annotated classification denoting a particular classification label(s) for the training source signal data signature files in the training library is [TYPE OF OUTPUT]. In some embodiments, the source signal data signature files in the training library may be provided to the model, e.g., encoded in a feature vector, to produce a predicted label. In some embodiments, an optimizer associated with the model may then compare the predicted label with the known output of a training pair including the training source signal data signature files in the training library to determine an error of the predicted label. In some embodiments, the optimizer may employ a loss function, such as, e.g., Hinge Loss, Multi-class SVM Loss, Cross Entropy Loss, Negative Log Likelihood, or other suitable classification loss function to determine the error of the predicted label based on the known output.

In some embodiments, the known output may be obtained after the model produces the prediction, such as in online learning scenarios. In such a scenario, the model may receive the source signal data signature files in the training library and generate the model output vector to produce a label classifying the source signal data signature files in the training library. Subsequently, a user may provide feedback by, e.g., modifying, adjusting, removing, and/or verifying the label via a suitable feedback mechanism, such as a user interface device (e.g., keyboard, mouse, touch screen, user interface, or other interface mechanism of a user device or any suitable combination thereof). The feedback may be paired with the source signal data signature files in the training library to form the training pair and the optimizer may determine an error of the predicted label using the feedback.

In some embodiments, the feedback may include, e.g., In some embodiments, post market testing and feedback may include, e.g., user feedback regarding the accuracy of predictions, clinical or health professional feedback regarding the accuracy of predictions, testing in medical studies, among other feedback or any combination thereof. In some embodiments, the feedback may be obtained via post-market surveillance of public use and reported performance from user's and/or clinicians of an already publicly deployed model, developer feedback based on developer testing with new training files, among other feedback on model outputs or any combination thereof.

In some embodiments, based on the error, the optimizer may update the parameters of the model using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique. As a result, the optimizer may update the parameters of the model based on the error of predicted labels in order to train the model to model the correlation between source signal data signature files in the training library and classification of a disease/condition/efficacy/biometric/etc. associated with a signal data signature file in order to produce more accurate labels of source signal data signature files in the training library.

In some embodiment, stage 108 of the HybridOps pipeline may include a model validation stage. Model validation may be a key component of the pipeline to track model performance during training. Validation data may be a subset of total training data. The total training data can include datasets for training, testing and/or validation, where each dataset within the training data includes separate data records so each of the training, testing and validation are performed with different data. As the model s being trained, the validation data may be used to monitor the performance of the model. Thus, the validation data may be kept separate from the training data otherwise the calculated performance metrics would not be accurate.

In some embodiment, stage 109 of the HybridOps pipeline may include generating a file for the trained model. In one embodiment, a machine learning model may be a file that has been trained to recognize certain types of patterns. A model is trained over a set of data, providing it an algorithm that it can use to produce predictions and/or correlations over and learn from those data. Once the model is trained, the model may be used to produce predictions and/or correlations over data that it modelled before and make predictions about those data.

In another embodiment, the output from model training may be used for inference, which means making predictions on new data. A model may be a distilled representation of what a machine learning system has learned.

In yet another embodiment, the model training process runs a series of scripts that accept user-defined parameters and orchestrate the execution of the training process. First, the desired training and validation datasets are cleaned and prepared for training, and then the actual model training begins. As the training progresses, the results of each epoch along with the model's hyperparameter set are stored in the model result database.

In some embodiments, stage 110 of the HybridOps pipeline may include a version control stage. Version control may be a component of the model training and validation pipeline that, when paired with a unique identification for each version, may enable traceability with insight into the development of the model, e.g., for regulatory approval and other model and model development auditing. Accordingly, version control may include maintaining a repository of each version of a model, including each version of each clone of a model. For example, a development clone of a publicly deployed model may have versions stored in the repository, where each version is defined by, e.g., each training epoch, each set of training epochs, each hyper-parameter adjustment, or according to any other suitable redeployment strategy of the development clone. Thus, changes may be made to the development clone such that a new version is deployed. Version control 110 may store each version in the repository (e.g., in a storage system, database, or other data storage solution or any combination thereof), with an accompanying identifier in order to track and retrieve each version as development progresses. Similarly, the public-facing model may be redeployed based on, e.g., validated versions of the development clone (e.g., validated for public use as an SaMD). Thus, similarly, each version of the public-facing model and each version of the glassbox or locked or standard reference model may be stored and tracked in the repository.

In some embodiments, each trained model may be versioned and then moved to the next stages of the pipeline. Any trained model made may be ensured to be saved and documented properly in the version control pipeline for maximum traceability and transparency.

In some embodiments, trained model versioning may be accomplished by versioning the driver code behind the overall pipeline. In another embodiment, trained model versioning may be accomplished by versioning the datasets and driver code.

In some embodiment, the version control system may ensure maximum transparency with regards to the model training and validation process. The version control may also ensure that changes of specified type and/or size to the pipeline are documented and stored for future reference. Such documentation ensures that the system meets regulatory requirements for documentation and that stable versions of the pipeline are easily accessible in the case of system failure or operator error (lost or overwritten data/code, etc.). Versioning the pipeline's various aspects may be also be used for providing a global access point of the codebase and database used by the company, ensuring that every authorized member of the company who needs access to code or data can get it from one place.

In some embodiment, stage 111 of the HybridOps pipeline may include a build phase. In some embodiments, the build phase serves to stitch the individual components together to create one working software entity. In one embodiment, a working backend system executes commands to the API endpoint. In some embodiments, extra steps are implemented into the workflow, such as the signal data signature feature engineering and class prediction.

In some embodiment, stage 112 of the HybridOps pipeline may include a testing phase for validation testing, verification, failure testing and unit testing of the trained model. In some embodiment, in order to set up the random testing, data must be randomly selected from an established database. To select the data, information may be passed to a testing script before the datasets are selected. The following may be set before the data selection begins or at any other suitable time:
  Total number of random data sets
  Total number of data samples per random data set for training
  Total number of data samples per random data set for validation
  Data source that stores both classes of data
  This can be expanded to multiple classes of data but the information may be stored in the database for the random selection to properly work In some embodiment, the validation and verification testing process utilizing random data sets starts by creating arrays for the data classes. In the example of two classes, class A and B will be stored into separate arrays indexed from 1 to the number of members. Then, a random seed for each of the classes, A and B, are set to make sure the process may be reproducible. For all the data selection of class A, indexes of the array may be selected at random until the total number selected meets the preset number of data samples required. Each index indicates an ID of a data file. The index and/or array may be stored and the file associated with that ID may be used in the corresponding set of data samples. The first part of the select data, sample one to number of training samples, are stored for training and the remainder, number of training samples plus one to number of validation samples will be stored for validation.

In some embodiments, testing includes at least three basic steps:
  1. Validation across at least five instances of the model to be tested (e.g., Variance <0.01 across multiple parallel untuned environments)
  2. Verification across at least five instances of the model to be tested, with or without additional training. (e.g., Medical Sensitivity >0.80, Medical Specificity >0.80, Medical Positive Predicative Value >0.80 and/or Negative Predictive Value >0.80)
  3. Test to Failure—Test, with or without additional training, until failure (e.g., overfitting, model drift, etc.)

Some embodiments using neural networks and/or neural network ensembles (aka RAND-NN) use train/test cycles for Steps 1-3. Some embodiments using ensembles and/or non-neural networks (aka RAND-HMM) uses a train test cycle for Step 1, then rotating random test cycles for Steps 2 & 3. In yet another embodiment, RAND testing may be used in the pipeline to allow parallel instances of machine learning models to be run at once. Using randomly selected data to train the models, parallel models are trained and the final results are compared against each other to check that the testing variance across the parallelly trained models does not exceed a threshold amount. In some embodiments, the threshold amount may include a variance of, e.g., This process allows testing for reproducibility of the model training to make sure one model does not train learn different than any of the other models in a way that would create it to predict final results differently.

In some embodiments, unit testing may be a process that allows the processes to be tested making sure the software does what may be expected and helps catch edge cases that may cause error. Unit testing enables individual parts to be tested to ensure that when the individual parts are combined together, it may be known that both the individual parts and the product as a whole will work in the intended fashion. In some embodiments, unit testing can involve 'assert' statements which assert that some expression may be upheld. This enables programmers to ensure that code works correctly on an atomic scale before integrating it with other work. For example, an assertion can ensure that a function written to retrieve a data structure with certain dimensions actually returns the data structure with the correct dimensions. Once this code needs to be integrated, it can be done so with the knowledge that the small portion of code being integrated would not be problematic.

In some embodiment, stage 113 of the HybridOps pipeline may include a deployment stage. In some embodiments, when the build reaches the Deployment stage, the software may be ready to be pushed to production. In a regulated development and deployment environment, regulatory approval may be required prior to release of the publicly facing SaMD.

In some embodiment, regulatory approval has not yet been granted and the deployment may be strictly for internal development and testing using an ML-Ops model. An automated deployment method may be used if the code only needs minor changes. However, if the application has gone through a major overhaul, the build may be first deployed to a production-like environment to monitor how the newly added code will behave.

In some embodiment, regulatory approval has been granted and the deployment may result in:
  1. a public facing model approved as a SaMD deployed under a DevOps model (see below),
  2. a standard reference clone of the SaMD deployed as a locked ML under a DevOps model (see below)
  3. a development clone of the SaMD for internal development and testing and deployed under an MLo-Ops model.

In some embodiments, any changes feed forward into the internal development model. An automated deployment method may be used if the code only needs minor changes. However, if the internal development application has gone through a major overhaul, the build may be first deployed to a production-like environment to monitor how the newly added code behaves. Implementing a blue-green deployment strategy may be also common when releasing updates.

In some embodiments, a blue-green deployment may include two identical production environments where one environment hosts the current application while the other hosts the updated version. To release the changes to the end-user, developers must submit the new version of the SaMD to regulators for regulatory approval of the changes or the new product version.

In some embodiment, stage 114 of the HybridOps pipeline may include an auto-integration testing, or prospective maintenance, stage. In some embodiments, auto integration tests are a way for code to have preset, prospectively approved, defined actions that a SaMD may be required to be able to perform for routine maintenance and to test the capabilities of the code to ensure that the code base works together even when making minor adjustments. This means that the goal of Auto Integration Tests may be to make sure the newest changes still allow the application to perform its function within the approved indications for use and scope of operations. Auto Integration Tests in this specific case may mean that models meet set performance thresholds and criteria to be integrated into the dynamic system as prospectively approved maintenance.

In some embodiment, stage 115 of the HybridOps pipeline may include a registry model stage. In some embodiments, the registry model may be the version for submission and approval by regulatory agencies. Upon regulatory approval the triphasic deployment will include:
1. a public facing approved version of the model for SaMD deployed under a DevOps model (see below),
2. a standard reference clone of the model for SaMD deployed as a locked ML under a DevOps model (see below)
3. a development clone of the SaMD for internal development and testing and deployed under an MLo-Ops model.

In some embodiment, stage 116 of the HybridOps pipeline may produce a public-facing approved version SaMD. In some embodiments, the public facing approved version SaMD may be deployed under a DevOps model in which the ML may be "unlocked" (machine learning enabled) and any post market testing and feedback are feed forward into the internal development model (see below). Prospective maintenance authorized at device approval may be part of the regular operation of the SaMD. In some embodiments, post market testing and feedback may include, e.g., user feedback regarding the accuracy of predictions, clinical or health professional feedback regarding the accuracy of predictions, testing in medical studies, among other feedback or any combination thereof.

In some embodiment, stage 117 of the HybridOps pipeline may include monitoring to measure and/or validate (Post-Market Surveillance) the public-facing SaMD. In some embodiments, continuous monitoring of the infrastructure, systems, and applications to make sure everything may be running smoothly as part of regulatory required post-market surveillance. Thus, in some embodiments, data from logs, analytics, and monitoring systems may be collected as well as feedback from use by real-world users to uncover any performance issues.

In some embodiment, stage 118 of the HybridOps pipeline may include a DevOps Feedback Pipeline. In some embodiments, the feedback gathered at the measure/validate 117 stage may be used to improve the overall efficiency of the ML-Ops pipeline to eliminate potential bottlenecks or other issues that might hinder productivity.

For example, in some embodiments, a user of the public-facing SaMD may interact with the public-facing SaMD on a user device, such as, e.g., on a computing device including a laptop computer, desktop computer, mobile device (e.g., smartphone, tablet, wearable or other mobile device), or any other suitable computing device or any combination thereof. The user may provide an input source signal data, such as a recording of a vocalization (e.g., a cough, sneeze, speech, breath, etc.). The public-facing SaMD may extract an input source signal data signature, e.g., using the processes of stages 102 and/or 103 and/or 104 as described above. The machine learning model of the public-facing SaMD may ingest the input source signal data signature to generate a prediction of a classification of the input source signal data. For example, the machine learning model may generate a disease, condition, quality, anomaly, or other classification characterizing a type and/or attribute of the input source signal data. The user may then make a selection regarding the accuracy and/or performance (e.g., whether an error occurred, speed of prediction, etc.) of the public-facing SaMD via user input. The public-facing SaMD may report a data log back to the DevOps pipeline that include the user input and the associated input source signal data and/or the associated input source signal data signature. The DevOps pipeline may then generate a training pair from the user input and the input source signal data signature with which the development clone may be trained. Thus, the approved public-facing model may be utilized by users while ongoing development of the model may be effectuated via the development clone based on the use of the users.

In some embodiments, the feedback may additionally or alternatively include performance and error data. For example, the user device may log each occurrence of a crash, non-responsive application, performance measurement (e.g., processor use, memory use, data communication use, etc.), among other performance-related metrics. The log may be reported back at stage 118 for the DevOps pipeline in order to perform bugfixes and security fixes, among other optimization and improvement processes. In some embodiments, the optimization and improvement processes may be performed on the development clone, the public-facing model, or the stored model 109, or any combination thereof.

In some embodiment, stage 119 of the HybridOps pipeline may produce an internal development clone ("development clone") of the approved public-facing version of the SaMD. In some embodiments, the internal development clone of approved public-facing SaMD may be deployed under an ML-Ops model in which the ML may be "unlocked" (machine learning enabled) such that testing and feedback performed on the development clone are feed forward into the ML-Ops pipeline for continued internal development model, e.g., via further training, testing and/or validation. Prospective maintenance authorized at device approval may be part of the regular operation of the SaMD.

In some embodiment, stage 120 of the HybridOps pipeline may include monitoring and validation of the internal development clone. In some embodiments, the monitoring/validation stage 120 may include continuous monitoring of the infrastructure, systems, and applications to make sure everything may be running smoothly as part of regulatory required post-market surveillance. Thus, in some embodiments, data from logs, analytics, and monitoring systems may be collected as well as feedback from developers to uncover any performance issues.

For example, in some embodiments, a developer of the development clone may interact with the development clone on a developer device, such as, e.g., on a computing device including a laptop computer, desktop computer, mobile device (e.g., smartphone, tablet, wearable or other mobile device), or any other suitable computing device or any combination thereof. The developer may provide an input source signal data, such as a recording of a vocalization (e.g., a cough, sneeze, speech, breath, etc.). The development clone may extract an input source signal data signature, e.g., using the processes of stages 102 and/or 103 and/or 104 as described above. The machine learning model of the development clone may ingest the input source signal data signature to generate a prediction of a classification of the input source signal data. For example, the machine learning model may generate a disease, condition, quality, anomaly, or other classification characterizing a type and/or attribute of the input source signal data. The developer may then make a selection regarding the accuracy and/or performance (e.g., whether an error occurred, speed of prediction, etc.) of the development clone via developer input. The development clone may report a data log back to the ML-Ops pipeline that include the developer input and the associated input source signal data and/or the associated input source signal data signature. The ML-Ops pipeline may then generate a training pair from the developer input and the input source signal data signature with which the development clone may be trained. Thus, the approved public-facing model may be utilized by developers while ongoing development of the model may be effectuated via the development clone based on the use of the developers.

In some embodiments, the feedback may additionally or alternatively include performance and error data. For example, the developer device may log each occurrence of a crash, non-responsive application, performance measurement (e.g., processor use, memory use, data communication use, etc.), among other performance-related metrics. The log may be reported back at stage 120 for the ML-Ops pipeline in order to perform bugfixes and security fixes, among other optimization and improvement processes. In some embodiments, the optimization and improvement processes may be performed on the development clone, the public-facing model, or the stored model 109, or any combination thereof.

In some embodiment, stage 121 of the HybridOps pipeline may include a ML-Ops Feedback Pipeline. In some embodiments, the feedback gathered at the Monitor stage may be used to improve the overall efficiency of the ML-Ops pipeline to eliminate potential bottlenecks or other issues that might hinder the efficiency and/or accuracy of development of the model.

In some embodiment, stage 122 of the HybridOps pipeline may produce a standard reference clone ("Glass-Box") of the approved public-facing SaMD. In some embodiments, the standard reference clone (Glass-Box) may be a clone of the approved public-facing SaMD deployed under a DevOps model in which the ML may be "locked" (machine learning disabled) and all testing and feedback are feed forward only into the internal development model. Prospective maintenance authorized at device approval may be part of the regular operation of the SaMD. The Standard Reference (Glass-Box) of the Approved SaMD may serve as a calibration reference for measuring model drift of the Public facing model approved as a SaMD. If the results generated by the Public Facing and the Standard reference clones diverge, model drift has occurred. The Standard Reference also serves as an indicator of concept drift in that the Standard Reference and the Public Facing will drift in the same numerical trend in light of concept drift.

In some embodiment, stage 123 of the HybridOps pipeline may include monitoring and validation of the standard reference (Glass-Box) clone. In some embodiments, continuous monitoring of the infrastructure, systems, and applications to be employed. Thus, in some embodiments, data from logs, analytics, and monitoring systems may be collected as well as feedback from users to uncover any performance issues. Feedback gathered at the Monitor/validate stage 123 may be used to improve the overall efficiency of the ML-Ops pipeline to eliminate potential bottlenecks or other issues that might hinder productivity. Any testing and feedback for the standard reference clone are feed forward into the internal development model.

Figure 7:
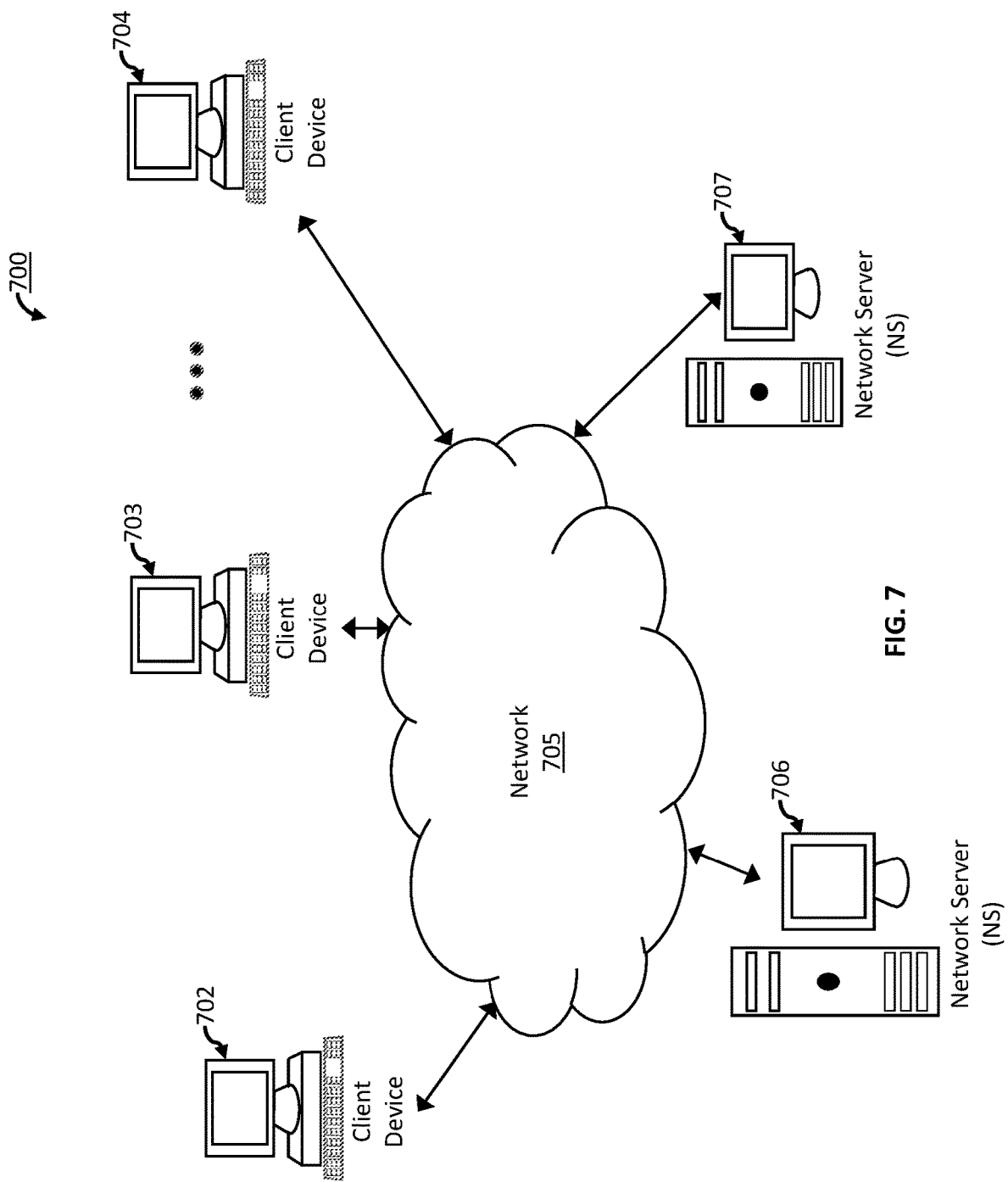
FIG. 7 depicts a block diagram of an exemplary computer-based system and platform 400 in accordance with one or more embodiments of the present disclosure.

FIG. 7 depicts a block diagram of an exemplary computer-based system and platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 700 may be configured to manage a large number of members and concurrent transactions, as detailed herein. In some embodiments, the exemplary computer-based system and platform 700 may be based on a scalable computer and network architecture that incorporates varies strategies for assessing the data, caching, searching, and/or database connection pooling. An example of the scalable architecture may be an architecture that may be capable of operating multiple servers.

In some embodiments, referring to FIG. 7, member computing device 702, member computing device 703 through member computing device 704 (e.g., clients) of the exemplary computer-based system and platform 700 may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, CBs citizens band radio, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that may be equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which may be remotely downloadable by the user using network protocols such as FTP, SSH, or other file transfer mechanisms. In some embodiments, a member device may provide several levels of user interface, for example, advance user, standard user. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 705 may also include mass storage, such as network attached storage (NAS), a storage area network (SAN), a content delivery network (CDN) or other forms of computer or machine readable media.

In some embodiments, the exemplary server 706 or the exemplary server 707 may be a web server (or a series of servers) running a network operating system, examples of which may include but are not limited to Apache on Linux or Microsoft IIS (Internet Information Services). In some embodiments, the exemplary server 706 or the exemplary server 707 may be used for and/or provide cloud and/or network computing. Although not shown in FIG. 7, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 201-204.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 8:
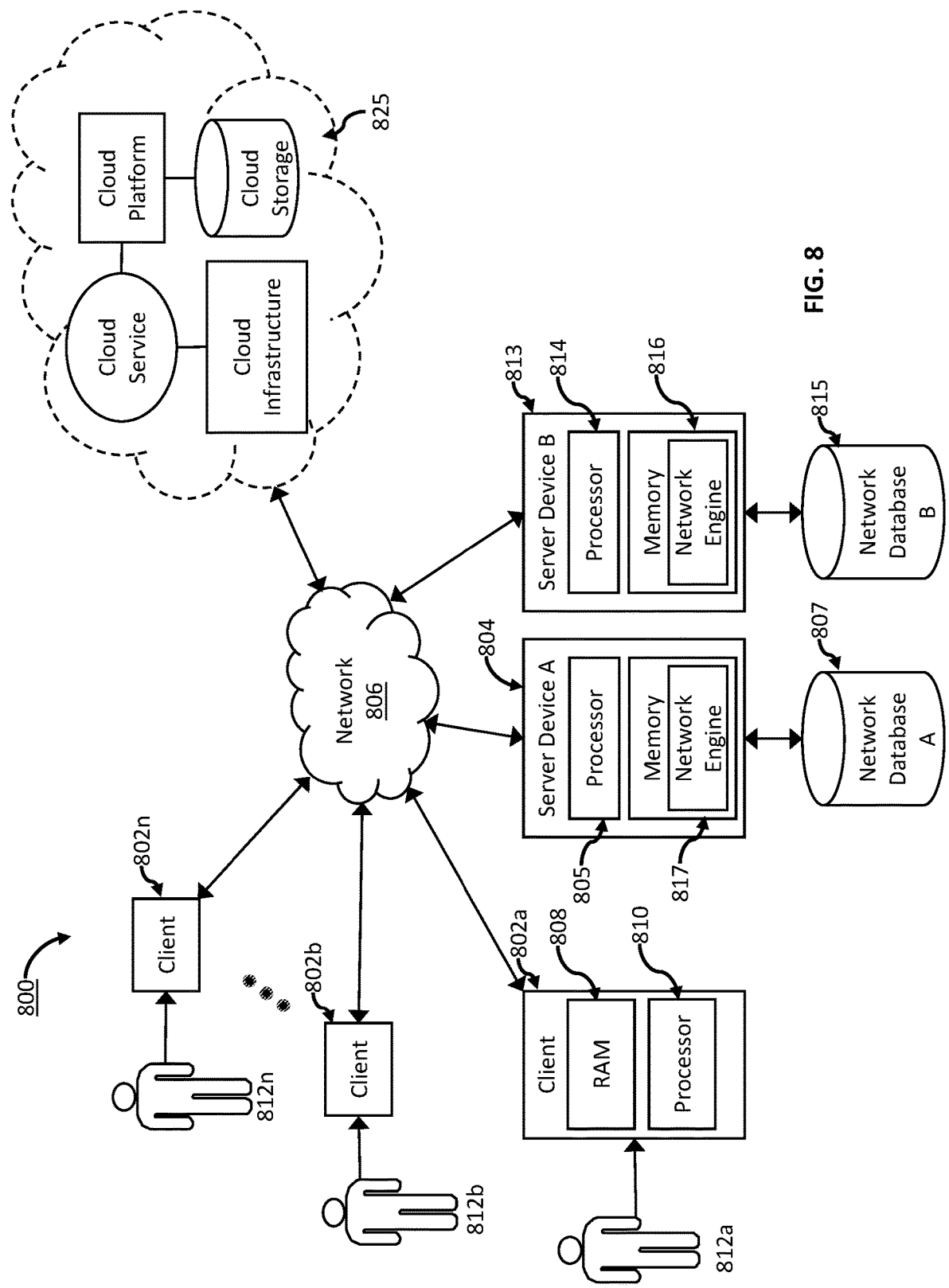
FIG. 8 depicts a block diagram of another exemplary computer-based system and platform 800 in accordance with one or more embodiments of the present disclosure.

FIG. 8 depicts a block diagram of another exemplary computer-based system and platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 802a, member computing device 802b through member computing device 802n shown each at least includes a computer-readable medium, such as a random-access memory (RAM) 808 coupled to a processor 810 or FLASH memory. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™, Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, user 812a, user 812b through user 812n, may communicate over the exemplary network 806 with each other and/or with other systems and/or devices coupled to the network 806. As shown in FIG. 8, exemplary server devices 804 and 813 may include processor 805 and processor 814, respectively, as well as memory 817 and memory 816, respectively. In some embodiments, the server devices 804 and 813 may be also coupled to the network 806. In some embodiments, one or more member computing devices 802a through 802n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that may be stored.

Figure 9:
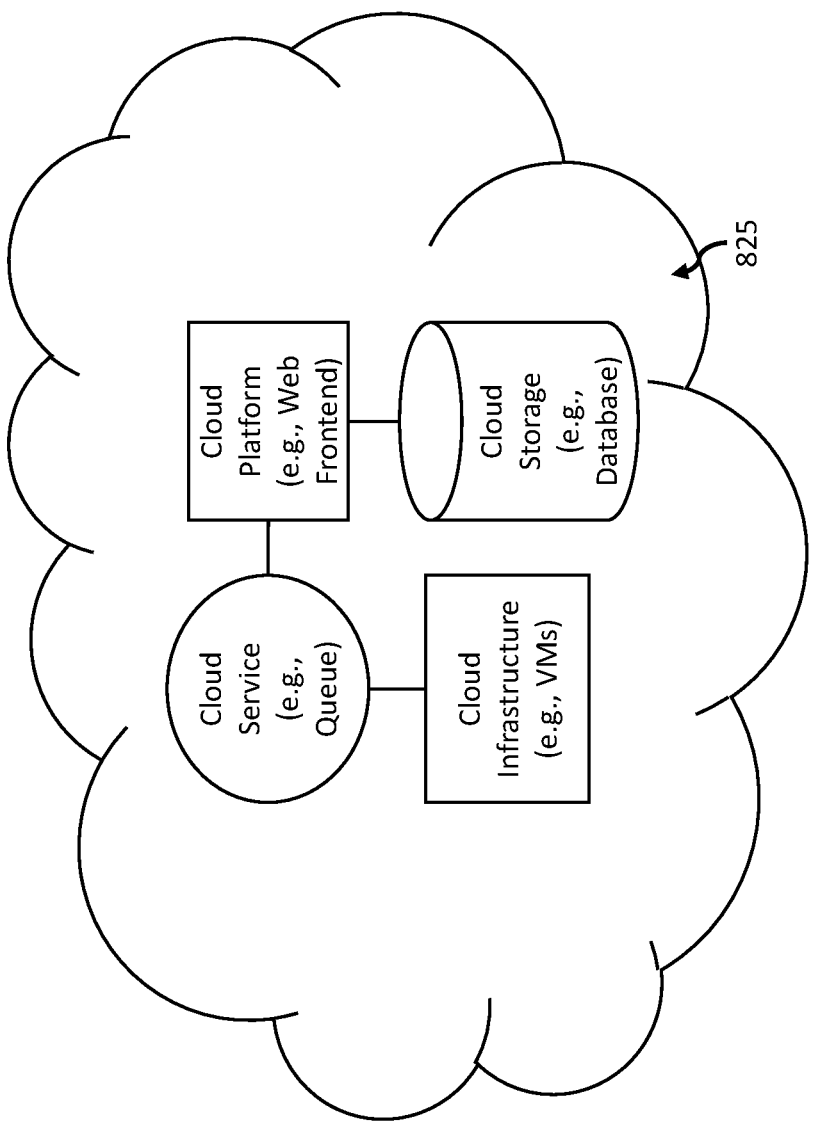
FIG. 9 illustrates schematics of an exemplary implementation of the cloud computing/architecture(s) in which the exemplary inventive computer-based systems/platforms, the exemplary inventive computer-based devices, and/or the exemplary inventive computer-based components of the present disclosure may be specifically configured to operate.
Figure 10:
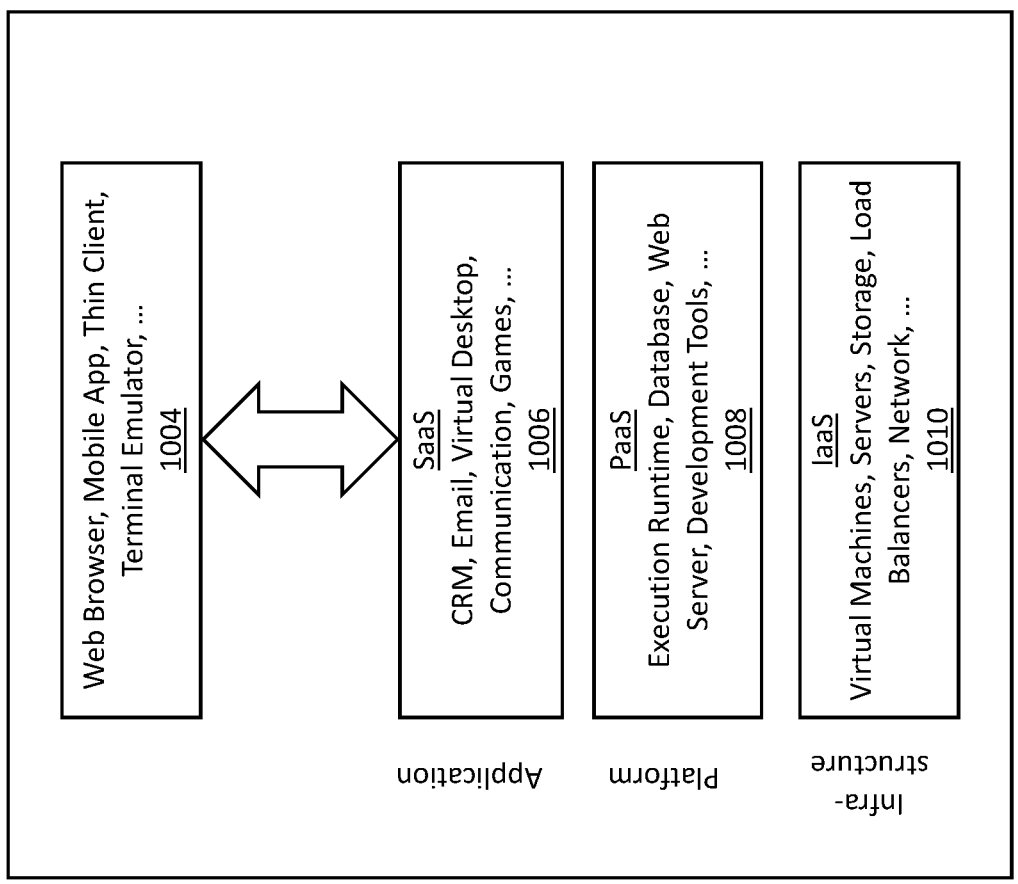
FIG. 10 illustrates schematics of another exemplary implementation of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be specifically configured to operate in a cloud computing/architecture 825 such as, but not limiting to: infrastructure a service (IaaS) 810, platform as a service (PaaS) 808, and/or software as a service (SaaS) 806 using a web browser, mobile app, thin client, terminal emulator or other endpoint 804. FIG. 9 and FIG. 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It may be understood that at least one aspect/functionality of various embodiments described herein can be performed in real-time and/or dynamically. As used herein, the term "real-time" may be directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that may be dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment may be implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but may be not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but may be not limited to, a mobile phone, Personal Digital Assistant (PDA), Blackberry™ Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this may be in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
   receiving, by at least one processor, a set of source signal data;
   extracting, by the at least one processor, a set of signal features from the set of source signal data to produce a set of signal data signatures for each source signal data record in the set of source signal data;
   generating, by the at least one processor, signal data signature features for each signal data signature of the set of signal data signatures based at least in part on the set of signal features;
   training, by the at least one processor, a machine learning model based on the signal data signature features for each signal data signature of the set of signal data signatures;
   deploying, by the at least one processor, a public facing machine learning model approved as a software as a medical device (SaMD) of the machine learning model for public deployment;
   deploying, by the at least one processor, a development clone of the machine learning model for use in a machine learning operations (ML-Ops) pipeline of an internal development environment;
   deploying, by the at least one processor, a locked clone of the machine learning model for use as a standard reference;
   receiving, by the at least one processor, external feedback from the public facing model comprising at least one public facing model performance metric indicative of public facing model performance of the public facing model;
   receiving, by the at least one processor, internal feedback from the development clone comprising at least one internal model performance metric indicative of internal model development performance of the development clone;
   receiving, by the at least one processor, internal feedback from the locked clone comprising at least one internal locked model performance metric indicative of internal locked model performance of the locked clone;
   measuring, by the at least one processor, a model drift, a context drift and a model progression associated with the public facing machine learning model, the development clone of the machine learning model, or both based at least in part on a difference between:
      at least one public facing model performance metric, and
      the at least one internal locked model performance metric; and
   optimizing, by the at least one processor, the development clone of the machine learning model based at least in part on the model drift, the context drift and the model progression.

2. The method of claim 1, further comprising:
   receiving, by the at least one processor, user feedback from at least one user device having the public facing machine learning model;
      wherein the user feedback comprises at least one user input indicating an accuracy of at least one prediction by the public facing machine learning model;
   receiving, by the at least one processor, a data log comprising at least one user signal data signature associated with the at least one prediction;
   generating, by the at least one processor, a training pair comprising the at least one user input and the at least one user signal data signature; and
   training, by the at least one processor, the development clone of the machine learning model based at least in part on the training pair.

3. The method of claim 1, further comprising:
   receiving, by the at least one processor, developer feedback from at least one developer device having the locked clone of the machine learning model;
   wherein the developer feedback comprises at least one developer input indicating an accuracy of at least one prediction by the locked clone of the machine learning model;
   receiving, by the at least one processor, a data log comprising at least one developer signal data signature associated with the at least one prediction;
   generating, by the at least one processor, a training pair comprising the at least one developer input and the at least one developer signal data signature; and
   training, by the at least one processor, the development clone of the machine learning model based at least in part on the training pair.

4. The method of claim 1, further comprising:
   generating, by the at least one processor, a second version of the development clone in response to optimizing the development clone;
      wherein a first version of the development clone comprises the development clone before optimizing the development; and
   storing, by the at least one processor, the first version of the development clone and the second version of the development clone in a version control database.

5. The method of claim 4, further comprising redeploying, by the at least one processor, the development clone of the machine learning model using the second version.

6. The method of claim 1, wherein the set of source signal data comprises a set of audio recordings, and the set of signal features comprise a set of source signal spectrograms associated with the set of audio recordings.

7. The method of claim 6, further comprising:
   filtering, by the at least one processor, each audio recording of the set of audio records with a first filter module to produce a first set of filtered audio recordings;
      wherein the first filter module comprises a first combination of audio filters arranged in a first sequence;
   filtering, by the at least one processor, each filtered audio recording of the first set of filtered audio recordings with at least one second filter module to produce a second set of filtered audio recordings;
      wherein the at least one second filter module comprises at least one second combination of audio filters arranged in at least one second sequence; and
   generating, by the at least one processor, the set of source signal spectrograms based at least in part on a mel-scale spectrogram of each filtered audio recording of the second set of filtered audio recordings.

8. A system comprising:
   at least one processor configured to execute software instructions that cause the at least one processor to perform steps to:

receive a set of source signal data;
extract a set of signal features from the set of source signal data to produce a set of signal data signatures for each source signal data record in the set of source signal data;
generate signal data signature features for each signal data signature of the set of signal data signatures based at least in part on the set of signal features;
train a machine learning model based on the signal data signature features for each signal data signature of the set of signal data signatures;
deploy a public facing machine learning model approved as a software as a medical device (SaMD) of the machine learning model for public deployment;
deploy a development clone of the machine learning model for use in a machine learning operations (ML-Ops) pipeline of an internal development environment;
deploy a locked clone of the machine learning model for use as a standard reference;
receive external feedback from the public facing model comprising at least one public facing model performance metric indicative of public facing model performance of the public facing model;
receive internal feedback from the development clone comprising at least one internal model performance metric indicative of internal model development performance of the development clone;
receive internal feedback from the locked clone comprising at least one internal locked model performance metric indicative of internal locked model performance of the locked clone;
measure a model drift, a context drift and a model progression associated with the public facing machine learning model, the development clone of the machine learning model, or both based at least in part on a difference between:
at least one public facing model performance metric, and
the at least one internal locked model performance metric; and
optimize the development clone of the machine learning model based at least in part on the model drift, the context drift and the model progression.

9. The system of claim 8, wherein the at least one processor is further configured to execute software instructions that cause the at least one processor to perform steps to:
receive user feedback from at least one user device having the public facing machine learning model;
wherein the user feedback comprises at least one user input indicating an accuracy of at least one prediction by the public facing machine learning model;
receive a data log comprising at least one user signal data signature associated with the at least one prediction;
generate a training pair comprising the at least one user input and the at least one user signal data signature; and
train the development clone of the machine learning model based at least in part on the training pair.

10. The system of claim 8, wherein the at least one processor is further configured to execute software instructions that cause the at least one processor to perform steps to:
receive developer feedback from at least one developer device having the locked clone of the machine learning model;
wherein the developer feedback comprises at least one developer input indicating an accuracy of at least one prediction by the locked clone of the machine learning model;
receive a data log comprising at least one developer signal data signature associated with the at least one prediction;
generate a training pair comprising the at least one developer input and the at least one developer signal data signature; and
train the development clone of the machine learning model based at least in part on the training pair.

11. The system of claim 8, wherein the at least one processor is further configured to execute software instructions that cause the at least one processor to perform steps to:
generate a second version of the development clone in response to optimizing the development clone;
wherein a first version of the development clone comprises the development clone before optimizing the development; and
store the first version of the development clone and the second version of the development clone in a version control database.

12. The system of claim 11, wherein the at least one processor is further configured to execute software instructions that cause the at least one processor to perform steps to redeploy the development clone of the machine learning model using the second version.

13. The system of claim 8, wherein the set of source signal data comprises a set of audio recordings, and the set of signal features comprise a set of source signal spectrograms associated with the set of audio recordings.

14. The system of claim 13, wherein the at least one processor is further configured to execute software instructions that cause the at least one processor to perform steps to:
filter each audio recording of the set of audio records with a first filter module to produce a first set of filtered audio recordings;
wherein the first filter module comprises a first combination of audio filters arranged in a first sequence;
filter each filtered audio recording of the first set of filtered audio recordings with at least one second filter module to produce a second set of filtered audio recordings;
wherein the at least one second filter module comprises at least one second combination of audio filters arranged in at least one second sequence; and
generate the set of source signal spectrograms based at least in part on a mel-scale spectrogram of each filtered audio recording of the second set of filtered audio recordings.

15. A non-transitory computer readable medium having software instructions stored thereon, the software instructions configured to cause at least one processor to perform steps comprising:
receiving a set of source signal data;
extracting a set of signal features from the set of source signal data to produce a set of signal data signatures for each source signal data record in the set of source signal data;
generating signal data signature features for each signal data signature of the set of signal data signatures based at least in part on the set of signal features;
training a machine learning model based on the signal data signature features for each signal data signature of the set of signal data signatures;

deploying a public facing machine learning model approved as a software as a medical device (SaMD) of the machine learning model for public deployment;

deploying a development clone of the machine learning model for use in a machine learning operations (ML-Ops) pipeline of an internal development environment;

deploying a locked clone of the machine learning model for use as a standard reference;

receiving external feedback from the public facing model comprising at least one public facing model performance metric indicative of public facing model performance of the public facing model;

receiving internal feedback from the development clone comprising at least one internal model performance metric indicative of internal model development performance of the development clone;

receiving internal feedback from the locked clone comprising at least one internal locked model performance metric indicative of internal locked model performance of the locked clone;

measuring a model drift, a context drift and a model progression associated with the public facing machine learning model, the development clone of the machine learning model, or both based at least in part on a difference between:
    at least one public facing model performance metric, and
    the at least one internal locked model performance metric; and optimizing the development clone of the machine learning model based at least in part on the model drift, the context drift and the model progression.

16. The non-transitory computer readable medium of claim 15, wherein the steps further comprise:
    receiving user feedback from at least one user device having the public facing machine learning model;
        wherein the user feedback comprises at least one user input indicating an accuracy of at least one prediction by the public facing machine learning model;
    receiving a data log comprising at least one user signal data signature associated with the at least one prediction;
    generating a training pair comprising the at least one user input and the at least one user signal data signature; and
    training the development clone of the machine learning model based at least in part on the training pair.

17. The non-transitory computer readable medium of claim 15, wherein the steps further comprise:
    receiving developer feedback from at least one developer device having the locked clone of the machine learning model;
        wherein the developer feedback comprises at least one developer input indicating an accuracy of at least one prediction by the locked clone of the machine learning model;
    receiving a data log comprising at least one developer signal data signature associated with the at least one prediction;
    generating a training pair comprising the at least one developer input and the at least one developer signal data signature; and
    training the development clone of the machine learning model based at least in part on the training pair.

18. The non-transitory computer readable medium of claim 15, wherein the steps further comprise:
    generating a second version of the development clone in response to optimizing the development clone;
        wherein a first version of the development clone comprises the development clone before optimizing the development; and
    storing the first version of the development clone and the second version of the development clone in a version control database.

19. The non-transitory computer readable medium of claim 18, wherein the steps further comprise redeploying the development clone of the machine learning model using the second version.

20. The non-transitory computer readable medium of claim 15, wherein the set of source signal data comprises a set of audio recordings, and the set of signal features comprise a set of source signal spectrograms associated with the set of audio recordings; and
    wherein the steps further comprise:
        filtering each audio recording of the set of audio records with a first filter module to produce a first set of filtered audio recordings;
        wherein the first filter module comprises a first combination of audio filters arranged in a first sequence;
        filtering each filtered audio recording of the first set of filtered audio recordings with at least one second filter module to produce a second set of filtered audio recordings;
        wherein the at least one second filter module comprises at least one second combination of audio filters arranged in at least one second sequence; and
        generating the set of source signal spectrograms based at least in part on a mel-scale spectrogram of each filtered audio recording of the second set of filtered audio recordings.

* * * * *